US008226469B2

(12) United States Patent
Pawloski et al.

(10) Patent No.: US 8,226,469 B2
(45) Date of Patent: Jul. 24, 2012

(54) GAMING SYSTEM, GAMING DEVICE, AND METHOD FOR PROVIDING A POKER GAME WITH A BONUS GAMING SESSION HAVING RE-DRAW OPTION

(75) Inventors: Jason P. Pawloski, Reno, NV (US); Christopher T. Brune, Carson City, NV (US)

(73) Assignee: IGT, Reno, NV (US)

( * ) Notice: Subject to any disclaimer, the term of this patent is extended or adjusted under 35 U.S.C. 154(b) by 91 days.

(21) Appl. No.: 12/893,738

(22) Filed: Sep. 29, 2010

(65) Prior Publication Data

US 2012/0077581 A1 Mar. 29, 2012

(51) Int. Cl.
*A63F 9/24* (2006.01)
*A63F 13/00* (2006.01)
*G06F 17/00* (2006.01)
*G06F 19/00* (2006.01)

(52) U.S. Cl. .......................................... 463/20; 463/30

(58) Field of Classification Search .................. 463/20, 463/30

See application file for complete search history.

(56) References Cited

U.S. PATENT DOCUMENTS 1,527,929 A 2/1925 Simons
3,876,208 A 4/1975 Wachtler et al.
3,998,462 A 12/1976 Goott
4,582,324 A 4/1986 Koza et al.
4,648,604 A 3/1987 Horan
4,743,022 A 5/1988 Wood
4,861,041 A 8/1989 Jones et al.
4,948,128 A 8/1990 Emery, II et al.
4,948,134 A 8/1990 Suttle et al.
5,010,995 A 4/1991 Okada
5,014,988 A 5/1991 Mirando et al.
5,019,973 A 5/1991 Wilcox et al.
5,022,653 A 6/1991 Suttle et al.
5,042,818 A 8/1991 Weingardt (Continued)

FOREIGN PATENT DOCUMENTS

AU 2003227287 3/2004

(Continued)

OTHER PUBLICATIONS

Barn Yard Article, written by Strictly Slots, published in Mar. 2002.

(Continued)

*Primary Examiner* — William M. Brewster
(74) *Attorney, Agent, or Firm* — Neal, Gerber & Eisenberg LLP

(57) ABSTRACT

A gaming system provides a bonus gaming session, which is activated during a play of a five-card draw poker base game when a predetermined plurality of the first set of five cards dealt meets a predetermined criteria, for example at least four of the five cards dealt and held by the player share a common suit. When activated, the gaming system repeats plays of the game in the bonus gaming session until a winning draw poker outcome has been generated. In the bonus gaming session, the card that is not co-suited with the plurality of the held first set of cards is discarded and randomly replaced until a winning five-card hand is generated. The gaming device provides an award when the winning five-card hand is generated. The gaming system provides a correspondingly larger award for a wining flush hand for each additional re-drawn fifth card required to achieve a winning five-card flush hand.

29 Claims, 18 Drawing Sheets

U.S. PATENT DOCUMENTS

| | | | |
|---|---|---|---|
| 5,098,107 | A | 3/1992 | Boylan et al. |
| 5,100,137 | A | 3/1992 | Fulton |
| 5,118,109 | A | 6/1992 | Gumina |
| 5,118,114 | A | 6/1992 | Tucci |
| 5,154,429 | A | 10/1992 | LeVasseur |
| 5,158,293 | A | 10/1992 | Mullins |
| 5,167,413 | A | 12/1992 | Fulton |
| 5,188,363 | A | 2/1993 | Marnell, II et al. |
| 5,248,142 | A | 9/1993 | Breeding |
| 5,251,897 | A | 10/1993 | Fulton |
| 5,255,915 | A | 10/1993 | Miller |
| 5,257,789 | A | 11/1993 | LeVasseur |
| 5,265,874 | A | 11/1993 | Dickinson et al. |
| 5,275,400 | A | 1/1994 | Weingardt et al. |
| 5,280,915 | A | 1/1994 | Groussman |
| 5,286,023 | A | 2/1994 | Wood |
| 5,288,082 | A | 2/1994 | Marquez |
| 5,294,120 | A | 3/1994 | Schultz |
| 5,308,065 | A | 5/1994 | Bridgeman et al. |
| 5,324,041 | A | 6/1994 | Boylan et al. |
| 5,356,140 | A | 10/1994 | Dabrowski et al. |
| 5,382,025 | A | 1/1995 | Sklansky et al. |
| 5,411,257 | A | 5/1995 | Fulton |
| 5,413,353 | A | 5/1995 | Demarest et al. |
| 5,415,404 | A | 5/1995 | Joshi et al. |
| 5,431,408 | A | 7/1995 | Adams |
| 5,437,451 | A | 8/1995 | Fulton |
| 5,451,054 | A | 9/1995 | Orenstein |
| 5,486,005 | A | 1/1996 | Neal |
| 5,489,101 | A | 2/1996 | Moody |
| 5,531,440 | A | 7/1996 | Dabrowski et al. |
| 5,531,441 | A | 7/1996 | Dabrowski et al. |
| 5,531,448 | A | 7/1996 | Moody |
| 5,542,669 | A | 8/1996 | Charron et al. |
| 5,544,892 | A | 8/1996 | Breeding |
| 5,570,885 | A | 11/1996 | Ornstein |
| 5,573,249 | A | 11/1996 | Johnson |
| 5,586,766 | A | 12/1996 | Forte et al. |
| 5,647,798 | A | 7/1997 | Falciglia |
| 5,653,444 | A | 8/1997 | Dahl |
| 5,678,821 | A | 10/1997 | Hedman |
| 5,697,614 | A | 12/1997 | Potter et al. |
| 5,704,835 | A | 1/1998 | Dietz, II |
| 5,711,525 | A | 1/1998 | Breeding |
| 5,718,431 | A | 2/1998 | Ornstein |
| 5,725,216 | A | 3/1998 | Jones |
| 5,732,950 | A | 3/1998 | Moody |
| 5,755,621 | A | 5/1998 | Marks et al. |
| 5,772,506 | A | 6/1998 | Marks et al. |
| 5,775,692 | A | 7/1998 | Watts et al. |
| 5,779,545 | A | 7/1998 | Berg et al. |
| 5,785,593 | A | 7/1998 | Wood et al. |
| 5,788,241 | A | 8/1998 | Ung |
| 5,788,574 | A | 8/1998 | Ornstein et al. |
| 5,794,934 | A | 8/1998 | Malcolm |
| 5,799,946 | A | 9/1998 | Groussman |
| 5,816,915 | A | 10/1998 | Kadlic |
| 5,816,916 | A | 10/1998 | Moody |
| 5,820,460 | A | 10/1998 | Fulton |
| 5,823,873 | A | 10/1998 | Moody |
| 5,823,874 | A | 10/1998 | Adams |
| 5,833,536 | A | 11/1998 | Davids et al. |
| 5,839,730 | A | 11/1998 | Pike |
| 5,839,732 | A | 11/1998 | Guidi |
| 5,845,907 | A | 12/1998 | Wells |
| 5,848,932 | A | 12/1998 | Adams |
| 5,851,011 | A | 12/1998 | Lott |
| 5,851,148 | A | 12/1998 | Brune et al. |
| 5,855,514 | A | 1/1999 | Kamille |
| 5,868,618 | A | 2/1999 | Netley et al. |
| 5,868,619 | A | 2/1999 | Wood et al. |
| 5,882,259 | A | 3/1999 | Holmes, Jr. et al. |
| 5,882,260 | A | 3/1999 | Marks et al. |
| 5,882,261 | A | 3/1999 | Adams |
| 5,897,436 | A | 4/1999 | Singer et al. |
| 5,902,983 | A | 5/1999 | Crevelt et al. |
| 5,908,353 | A | 6/1999 | Andrews |
| 5,911,418 | A | 6/1999 | Adams |
| 5,911,419 | A | 6/1999 | Delaney et al. |
| 5,921,550 | A | 7/1999 | Awada |
| 5,934,998 | A | 8/1999 | Forte et al. |
| 5,944,314 | A | 8/1999 | Stavinsky |
| 5,947,821 | A | 9/1999 | Stone |
| 5,947,822 | A | 9/1999 | Weiss |
| 5,951,012 | A | 9/1999 | Feola |
| 5,951,397 | A | 9/1999 | Dickinson |
| 5,954,335 | A | 9/1999 | Moody |
| 5,957,774 | A | 9/1999 | Holmes, Jr. et al. |
| 5,964,464 | A | 10/1999 | Jones |
| 5,967,894 | A | 10/1999 | Kinoshita et al. |
| 5,971,849 | A | 10/1999 | Falciglia |
| 5,975,529 | A | 11/1999 | De Keller |
| 5,976,016 | A | 11/1999 | Moody et al. |
| 5,984,309 | A | 11/1999 | Santin |
| 5,988,643 | A | 11/1999 | Awada |
| 5,997,002 | A | 12/1999 | Goldman |
| 6,007,066 | A | 12/1999 | Moody |
| 6,007,424 | A | 12/1999 | Evers et al. |
| 6,012,719 | A | 1/2000 | Webb |
| 6,012,720 | A | 1/2000 | Webb |
| 6,015,346 | A | 1/2000 | Bennett |
| 6,019,374 | A | 2/2000 | Breeding |
| 6,033,307 | A | 3/2000 | Vancura |
| 6,039,648 | A | 3/2000 | Guinn et al. |
| 6,045,129 | A | 4/2000 | Cooper et al. |
| 6,048,267 | A | 4/2000 | Wichinsky |
| 6,050,568 | A | 4/2000 | Hachquet |
| 6,056,641 | A | 5/2000 | Webb |
| 6,059,289 | A | 5/2000 | Vancura |
| 6,059,658 | A | 5/2000 | Mangano et al. |
| 6,062,980 | A | 5/2000 | Luciano |
| 6,079,711 | A | 6/2000 | Wei et al. |
| 6,089,976 | A | 7/2000 | Schneider et al. |
| 6,089,977 | A | 7/2000 | Bennett |
| 6,093,100 | A | 7/2000 | Singer et al. |
| 6,098,985 | A | 8/2000 | Moody |
| 6,102,798 | A | 8/2000 | Bennett |
| 6,110,040 | A | 8/2000 | Sanduski et al. |
| 6,120,378 | A | 9/2000 | Moody et al. |
| 6,129,357 | A | 10/2000 | Wichinsky |
| 6,131,907 | A | 10/2000 | Nucifora et al. |
| 6,131,908 | A | 10/2000 | Palmer |
| 6,132,311 | A | 10/2000 | Williams |
| 6,135,453 | A | 10/2000 | Srichayaporn |
| 6,135,882 | A | 10/2000 | Kadlic |
| 6,135,883 | A | 10/2000 | Hachquet |
| 6,146,271 | A | 11/2000 | Kadlic |
| 6,149,156 | A | 11/2000 | Feola |
| 6,149,157 | A | 11/2000 | Suan |
| 6,149,521 | A | 11/2000 | Sanduski |
| 6,155,568 | A | 12/2000 | Franklin |
| 6,155,925 | A | 12/2000 | Giobbi et al. |
| 6,159,095 | A | 12/2000 | Frohm et al. |
| 6,159,097 | A | 12/2000 | Gura |
| 6,159,098 | A | 12/2000 | Slomiany et al. |
| 6,164,652 | A | 12/2000 | Lauretta et al. |
| 6,173,955 | B1 | 1/2001 | Perrie et al. |
| 6,174,235 | B1 | 1/2001 | Walker et al. |
| 6,176,781 | B1 | 1/2001 | Walker et al. |
| 6,179,293 | B1 | 1/2001 | Hedman |
| 6,186,894 | B1 | 2/2001 | Mayeroff |
| 6,203,428 | B1 | 3/2001 | Giobbi et al. |
| 6,203,429 | B1 | 3/2001 | Demar et al. |
| 6,206,374 | B1 | 3/2001 | Jones |
| 6,206,780 | B1 | 3/2001 | Awada |
| 6,220,959 | B1 | 4/2001 | Holmes, Jr. et al. |
| 6,220,960 | B1 | 4/2001 | Kryzhanovsky |
| 6,224,055 | B1 | 5/2001 | Walker et al. |
| 6,224,483 | B1 | 5/2001 | Mayeroff |
| 6,227,969 | B1 | 5/2001 | Yoseloff |
| 6,231,442 | B1 | 5/2001 | Mayeroff |
| 6,237,916 | B1 | 5/2001 | Webb |
| 6,248,016 | B1 | 6/2001 | Walker et al. |
| 6,250,685 | B1 | 6/2001 | Walker et al. |
| 6,257,979 | B1 | 7/2001 | Walker et al. |
| 6,261,177 | B1 | 7/2001 | Bennett |
| 6,270,078 | B1 | 8/2001 | Leone et al. |

| | | | |
|---|---|---|---|
| 6,270,079 | B1 | 8/2001 | Chamberlain |
| 6,270,405 | B1 | 8/2001 | Ferguson |
| 6,283,855 | B1 | 9/2001 | Bingham |
| RE37,414 | E | 10/2001 | Harlick |
| 6,299,170 | B1 | 10/2001 | Yoseloff |
| 6,299,532 | B1 | 10/2001 | Smith |
| 6,305,686 | B1 | 10/2001 | Perrie et al. |
| 6,309,300 | B1 | 10/2001 | Glavich |
| 6,312,334 | B1 | 11/2001 | Yoseloff |
| 6,322,445 | B1 | 11/2001 | Miller |
| 6,332,614 | B1 | 12/2001 | Hesse |
| 6,332,839 | B2 | 12/2001 | Walker et al. |
| 6,334,613 | B1 | 1/2002 | Yoseloff |
| 6,334,614 | B1 | 1/2002 | Breeding |
| 6,336,859 | B2 | 1/2002 | Jones et al. |
| 6,342,007 | B1 | 1/2002 | Wood et al. |
| 6,345,007 | B1 | 2/2002 | Kim |
| 6,345,823 | B1 | 2/2002 | Webb |
| 6,358,144 | B1 | 3/2002 | Kadlic et al. |
| 6,368,214 | B1 | 4/2002 | Luciano |
| 6,371,851 | B1 | 4/2002 | Singer et al. |
| 6,375,187 | B1 | 4/2002 | Baerlocher |
| 6,402,150 | B1 | 6/2002 | Jones |
| 6,405,174 | B1 | 6/2002 | Walker et al. |
| 6,406,023 | B1 | 6/2002 | Rowe |
| 6,406,369 | B1 | 6/2002 | Baerlocher et al. |
| 6,409,173 | B1 | 6/2002 | Tri |
| 6,409,174 | B1 | 6/2002 | Demarest |
| 6,416,407 | B1 | 7/2002 | Carrico et al. |
| 6,428,002 | B1 | 8/2002 | Baranauskas |
| 6,435,506 | B1 | 8/2002 | Piccoli |
| 6,439,995 | B1 | 8/2002 | Hughs-Baird et al. |
| 6,443,456 | B1 | 9/2002 | Gajor |
| 6,461,240 | B1 | 10/2002 | Perkins |
| 6,471,208 | B2 | 10/2002 | Yoseloff et al. |
| 6,478,675 | B1 | 11/2002 | Awada |
| 6,506,118 | B1 | 1/2003 | Baerlocher et al. |
| 6,533,658 | B1 | 3/2003 | Walker et al. |
| 6,547,242 | B1 | 4/2003 | Sugiyama et al. |
| 6,565,432 | B2 | 5/2003 | Moody |
| 6,595,852 | B2 | 7/2003 | Wang |
| 6,602,137 | B2 | 8/2003 | Kaminkow et al. |
| 6,607,438 | B2 | 8/2003 | Baerlocher et al. |
| 6,632,141 | B2 | 10/2003 | Webb et al. |
| 6,648,754 | B2 | 11/2003 | Baerlocher et al. |
| 6,729,621 | B2 | 5/2004 | Moody |
| 6,729,961 | B1 | 5/2004 | Millerschone |
| 6,733,386 | B2 | 5/2004 | Cuddy et al. |
| 6,780,110 | B2 | 8/2004 | Baerlocher et al. |
| 6,877,745 | B1 | 4/2005 | Walker et al. |
| 6,923,446 | B2 | 8/2005 | Snow |
| 6,994,624 | B2 | 2/2006 | Gold et al. |
| 7,000,921 | B2 | 2/2006 | Schultz |
| 7,029,395 | B1 | 4/2006 | Baerlocher |
| 7,052,392 | B2 | 5/2006 | Tessmer et al. |
| 7,160,190 | B2 | 1/2007 | Baerlocher et al. |
| 7,166,028 | B2 | 1/2007 | Fasbender et al. |
| 7,297,057 | B2 | 11/2007 | Gerrard et al. |
| 7,387,568 | B2 | 6/2008 | Millerschone |
| 7,390,258 | B2 | 6/2008 | Millerschone |
| 7,393,276 | B2 | 7/2008 | Millerschone |
| 7,726,655 | B2 | 6/2010 | Walker et al. |
| 2002/0082069 | A1 | 6/2002 | Parker |
| 2002/0086725 | A1 | 7/2002 | Fasbender et al. |
| 2003/0008705 | A1 | 1/2003 | Baerlocher et al. |
| 2003/0060276 | A1 | 3/2003 | Walker et al. |
| 2003/0073476 | A1 | 4/2003 | Friedman |
| 2003/0130024 | A1 | 7/2003 | Darby |
| 2003/0236115 | A1 | 12/2003 | Chamberlain |
| 2004/0033830 | A1 | 2/2004 | Gold et al. |
| 2004/0043807 | A1 | 3/2004 | Pennington |
| 2004/0048650 | A1 * | 3/2004 | Mierau et al. .................... 463/20 |
| 2004/0116174 | A1 | 6/2004 | Baerlocher et al. |
| 2004/0224743 | A1 | 11/2004 | Tarantino |
| 2005/0054409 | A1 | 3/2005 | Cannon |
| 2005/0113161 | A1 | 5/2005 | Walker et al. |
| 2005/0148378 | A1 | 7/2005 | Fasbender et al. |
| 2006/0060266 | A1 | 3/2006 | Bales et al. |
| 2006/0066051 | A1 | 3/2006 | Nicely |
| 2006/0113729 | A1 | 6/2006 | Dodge |
| 2006/0223611 | A1 | 10/2006 | Baerlocher et al. |
| 2006/0247040 | A1 | 11/2006 | Walker et al. |
| 2006/0287041 | A1 | 12/2006 | Walker et al. |
| 2007/0054721 | A1 | 3/2007 | Jackson |
| 2007/0060254 | A1 | 3/2007 | Muir |
| 2007/0135193 | A1 | 6/2007 | Nicely |
| 2008/0064462 | A1 | 3/2008 | Gerrard |
| 2008/0202863 | A1 | 8/2008 | Rossignol et al. |
| 2008/0220851 | A1 | 9/2008 | Glavich et al. |
| 2008/0252011 | A1 | 10/2008 | Bickley et al. |
| 2009/0124316 | A1 | 5/2009 | Baerlocher et al. |
| 2009/0224478 | A1 | 9/2009 | Evans et al. |
| 2009/0247263 | A1 * | 10/2009 | Inamura .......................... 463/20 |
| 2010/0267440 | A1 | 10/2010 | Walker et al. |

FOREIGN PATENT DOCUMENTS

| | | |
|---|---|---|
| AU | 2004203449 | 2/2005 |
| AU | 2004222759 | 5/2006 |
| EP | 0 945 837 | 9/1999 |
| GB | 2 106 292 | 8/1981 |
| GB | 2 100 905 | 1/1983 |
| GB | 2 170 636 | 8/1986 |
| GB | 2 180 087 | 3/1987 |
| GB | 2 222 712 | 3/1990 |
| GB | 2 226 436 | 6/1990 |
| GB | 2 335 524 | 9/1999 |
| GB | 2 390 822 | 1/2004 |
| GB | 2 406 288 | 3/2005 |

OTHER PUBLICATIONS

Gold Fever Advertisement, written by Atronic Casino Technology, Ltd., published in 1999.

Gold Fever Atronic Web Page, written by Atronic Casino Technology, Ltd., [online] [retrieved from the internet Mar. 13, 2002] <http://www.atronic.com/products/reelslots/goldfever/content.shtml>.

On the Money Article, written by Strictly Slots, published in Dec. 2000.

Office Action for U.S. Appl. No. 10/233,245 dated Jul. 27, 2005.

Extended European Search Report for corresponding EP Application No. EP 11 17 7860.1, dated Nov. 29, 2011 (7 pages).

* cited by examiner 210
200
210a
210b
210c
210d
210e
1CR
2CR
3CR
4CR
Flush Fever
ROYAL FLUSH 500 750 1000 4000 4000
STRAIGHT FLUSH 100 150 200 250 250
4 OF A KIND 50 75 100 125 125
FULL HOUSE 18 27 36 45 45
FLUSH 12 18 24 30 45
STRAIGHT 8 12 16 20 20
3 OF A KIND 6 9 12 15 15
TWO PAIR 4 6 8 10 10
JACKS OR BETTER 2 3 4 5 5
Flush Counter
2
204
Credits Won
45
206
FLUSH FEVER ENDED -- FLUSH!
202
220a
220b
220c
220d
220e
HOLD
HOLD
HOLD
HOLD
HOLD
222a
222b
222c
222d
222e
Total Credits:
7
224
Winner!
Congratulations, you have drawn a flush!
226

FIG. 6

| a | b | c | d | e | f | g |
|---|---|---|---|---|---|---|
| Win Category | 1c Pays | 2c Pays | 3c Pays | 4c Pays | 5c Pays | Flush Fever |
| Royal Flush | 250 | 500 | 750 | 1000 | 4000 | 4122 |
| Straight Flush | 50 | 100 | 150 | 200 | 250 | 281 |
| 4 of a Kind | 25 | 50 | 75 | 100 | 125 | 125 |
| Full House | 9 | 18 | 27 | 36 | 45 | 45 |
| Flush | 6 | 12 | 18 | 24 | 30 | 33 |
| Straight | 4 | 8 | 12 | 16 | 20 | 20 |
| 3 of a Kind | 3 | 6 | 9 | 12 | 15 | 15 |
| Two Pair | 2 | 4 | 6 | 8 | 10 | 10 |
| Jacks or Better | 1 | 2 | 3 | 4 | 5 | 5 |

GAMING SYSTEM, GAMING DEVICE, AND METHOD FOR PROVIDING A POKER GAME WITH A BONUS GAMING SESSION HAVING RE-DRAW OPTION

COPYRIGHT NOTICE

A portion of the disclosure of this patent document contains material which is subject to copyright protection. The copyright owner has no objection to the photocopy reproduction of the patent document or the patent disclosure in exactly the form it appears in the Patent and Trademark Office patent file or records, but otherwise reserves all copyright rights whatsoever.

BACKGROUND OF THE INVENTION

The popularity of a gaming devices depends in part upon the level of enjoyment and excitement that the game provides to its players. Gaming device manufacturers constantly strive to make gaming devices that provide as much enjoyment and excitement as possible. Providing a bonus round or bonus gaming session in which a player has an opportunity to win larger awards or credits in conjunction with the base game operation of the gaming device is one way to enhance player enjoyment and excitement.

Known gaming devices having bonus gaming sessions have employed a triggering event that occurs during the base game operation of the gaming device. The triggering event enables a player to play a bonus round or bonus game to its fruition and then return to the base game. There is a continuing need to improve base games by providing new bonus games that provide one or more bonus awards to enhance player enjoyment and excitement.

SUMMARY

The present disclosure relates generally to gaming systems, gaming devices and methods that provide an interactive wagering game, such as a draw poker game associated with a bonus gaming session that includes a free player opportunity such as a re-draw option upon the satisfaction of certain criteria.

In one embodiment, the gaming device enables a player to start a gaming session by placing a wager on a play of the draw poker game. In the gaming session, the player plays one or more plays of a traditional draw poker game. In each play of the poker game, the gaming device deals a randomly selected first set of cards to the player. The gaming device enables the player to select none, one or more than one of the first set of cards to be held. The gaming device evaluates the held first set of cards to determine whether the held first set of cards meets a triggering condition. If the held first set of cards meets the triggering condition, the play of the poker game enters a bonus gaming session. If the held first set of cards does not meet the triggering condition, the play of the poker game does not enter the bonus gaming session.

In the bonus gaming session, the card(s) not selected to be held are discarded and replaced with new randomly selected card(s) to form a first hand of cards. The gaming device evaluates the first hand of cards to determine whether the first hand is a winning hand.

If the first hand of cards is a non-winning hand, the bonus game continues and the gaming device re-displays the first set of cards to the player, and the discarding and replacing steps are repeated until the first hand of cards is determined to be a winning hand.

When the first hand of cards is determined to be a first winning hand, the gaming device evaluates the first winning hand to determine whether it has a designated winning rank or a non-designated winning rank. When the first winning hand has a non-designated winning rank, the gaming device determines a first award according to a first paytable to provide to the player. After the gaming device provides the first award from the first paytable, the bonus gaming session ends, but the gaming session continues.

When the first winning hand has the designated winning rank, the gaming device determines a second award according to a second different or paytable, and provides the second award to the player. After the gaming device provides the second award from the second paytable, both the bonus gaming session and the gaming session end.

The gaming device determines or adjusts the amount of the second award in the second dynamic paytable based upon how many qualified events occur during the gaming session. The qualified events counted during the gaming session include: (1) each time a non-winning first hand of cards occurs in within any bonus gaming session of the gaming session; and (2) each time a winning non-designated hand occurs within any bonus gaming session of the gaming session. A memory device of or associated with the gaming device stores and maintains a count of how many qualified events have taken place within the gaming session. When a designated winning hand occurs to end the gaming session, the second award associated with the second dynamic paytable is higher when the number of qualified events is higher.

In one such five card draw poker embodiment, the designated winning hand includes a hand with a flush ranking and the non-designated winning hand includes a hand with any non-flush winning rank according to a traditional draw poker paytable. In such an embodiment, the qualified events counted by the gaming device during the gaming session include each time a non-winning first hand occurs in the first hand of cards and each time a non-flush winning hand occurs within any bonus gaming session. The gaming device enables a player to start a play of a five card draw poker game in a gaming session by placing a wager. After receiving the wager from the player, the gaming device randomly selects and displays five cards to form a first set of cards. The gaming device enables the player to select none, one or a plurality of the first set of cards to be held.

In this embodiment, the gaming device evaluates the held first set of cards to determine whether four or five of the held first set of cards share a common suit of either hearts, diamonds, spades, or clubs. If fewer than four cards of the held first set of cards have a common suit, the play of the game does not enter the bonus gaming session. If four or five cards of the held first set of cards share a suit, the bonus gaming session begins.

In the bonus gaming session, the gaming device discards each card not selected by the player. The gaming device provides a new randomly selected replacement card to each card discarded from the first set of cards and forms a first hand of cards including the held first set of cards and any replacement cards. The gaming device evaluates the first hand to determine whether the first hand is a non-winning hand or a winning hand according to a traditional draw poker paytable.

If the first hand is a non-winning hand, the gaming device increments a flush counter by one. The gaming device redisplays the first set of cards to the player, and the play of the first set of cards starts over. The gaming device repeats the steps of discarding the non-held cards from the first set of cards and replacing the discarded cards with replacement cards to form a modified first hand of cards. This discard, replacement and evaluation process repeats beginning with the first set of cards until the gaming device determines that the modified first hand is any winning hand according to a traditional draw poker paytable. For each additional repeat of the process in which the modified first hand is a non-winning hand, the gaming device increments the flush counter by one.

When the first hand is a winning hand according to a traditional draw poker paytable, the gaming device further evaluates the first winning hand to determine whether it has a non-flush ranking or a flush ranking. If the first winning hand has a non-flush ranking, the gaming device increments the flush counter by one and determines a non-flush award according to a first paytable. The gaming device provides the non-flush award to the player according to a first paytable, and the bonus gaming session ends.

If the first winning hand of the bonus gaming session has a flush ranking, the gaming device determines the current number accumulated on the flush counter during the gaming session. The second dynamic paytable includes increasingly higher relative corresponding awards than the first paytable for each flush counter number greater than an initial value. The gaming device determines a flush award associated with the second dynamic paytable and provides the flush award to the player. The gaming device resets the increment flush counter to zero and both the bonus gaming session and gaming session end.

Additional features and advantages are described in, and will be apparent from, the following Detailed Description and the figures.

BRIEF DESCRIPTION OF THE FIGURES

FIG. 6 illustrates a sample base game and bonus game paytable for the gaming system of one embodiment disclosed herein.

DETAILED DESCRIPTION

The present disclosure may be implemented in various configurations for gaming machines, gaming devices, or gaming systems, including but not limited to: (1) a dedicated gaming machine, gaming device, or gaming system wherein the computerized instructions for controlling any games (which are provided by the gaming machine or gaming device) are provided with the gaming machine or gaming device prior to delivery to a gaming establishment; and (2) a changeable gaming machine, gaming device, or gaming system wherein the computerized instructions for controlling any games (which are provided by the gaming machine or gaming device) are downloadable to the gaming machine or gaming device through a data network after the gaming machine or gaming device is in a gaming establishment. In one embodiment, the computerized instructions for controlling any games are executed by at least one central server, central controller, or remote host. In such a "thin client" embodiment, the central server remotely controls any games (or other suitable interfaces) and the gaming device is utilized to display such games (or suitable interfaces) and receive one or more inputs or commands from a player. In another embodiment, the computerized instructions for controlling any games are communicated from the central server, central controller, or remote host to a gaming device local processor and memory devices. In such a "thick client" embodiment, the gaming device local processor executes the communicated computerized instructions to control any games (or other suitable interfaces) provided to a player.

In one embodiment, one or more gaming devices in a gaming system may be thin client gaming devices and one or more gaming devices in the gaming system may be thick client gaming devices. In another embodiment, certain functions of the gaming device are implemented in a thin client environment and certain other functions of the gaming device are implemented in a thick client environment. In one such embodiment, computerized instructions for controlling any primary games are communicated from the central server to the gaming device in a thick client configuration and computerized instructions for controlling any secondary games or bonus functions are executed by a central server in a thin client configuration.

Figure 1A:
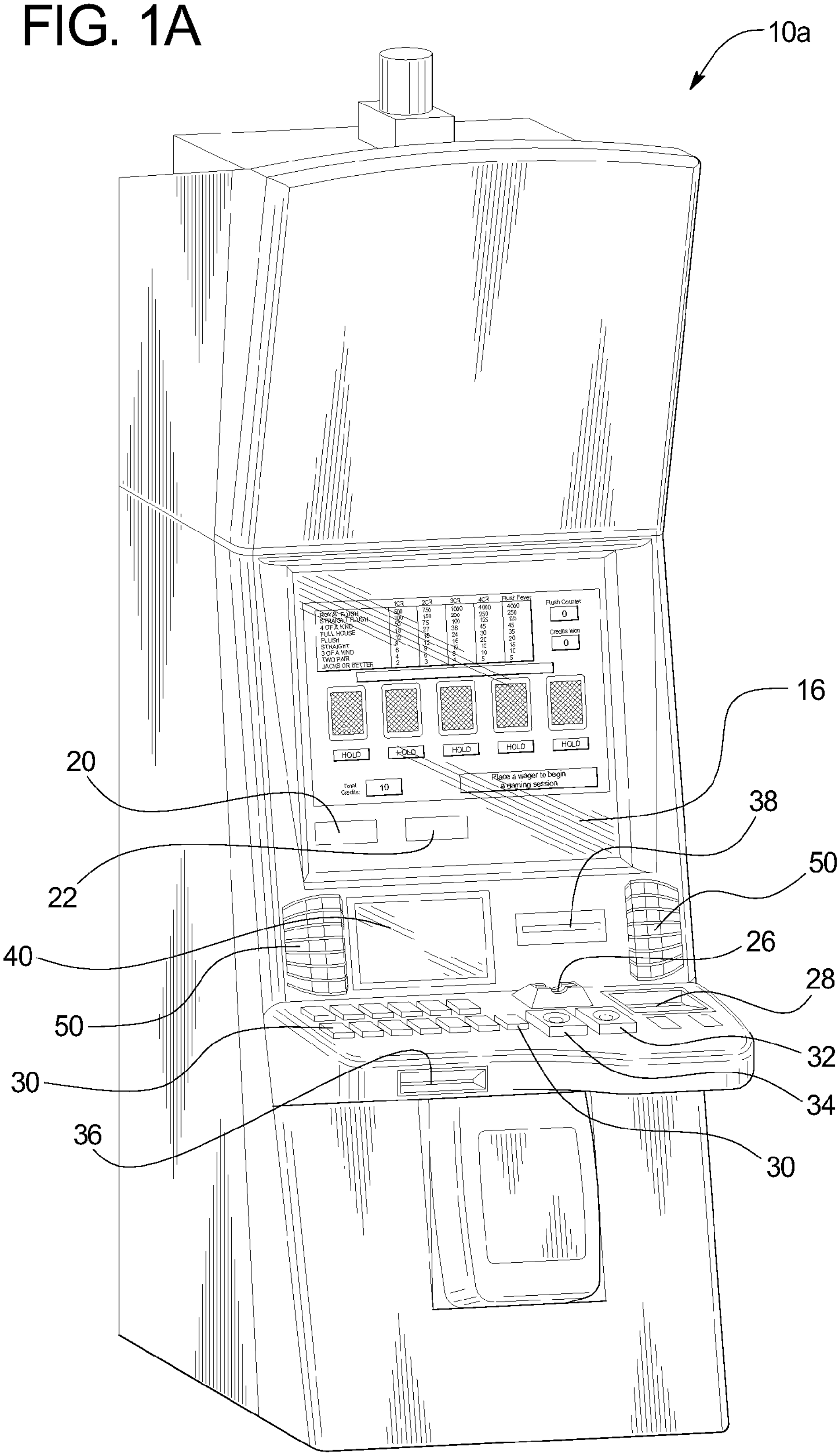
FIGS. 1A and 1B are perspective views of example alternative embodiments of the gaming device of the present disclosure.
Figure 1B:
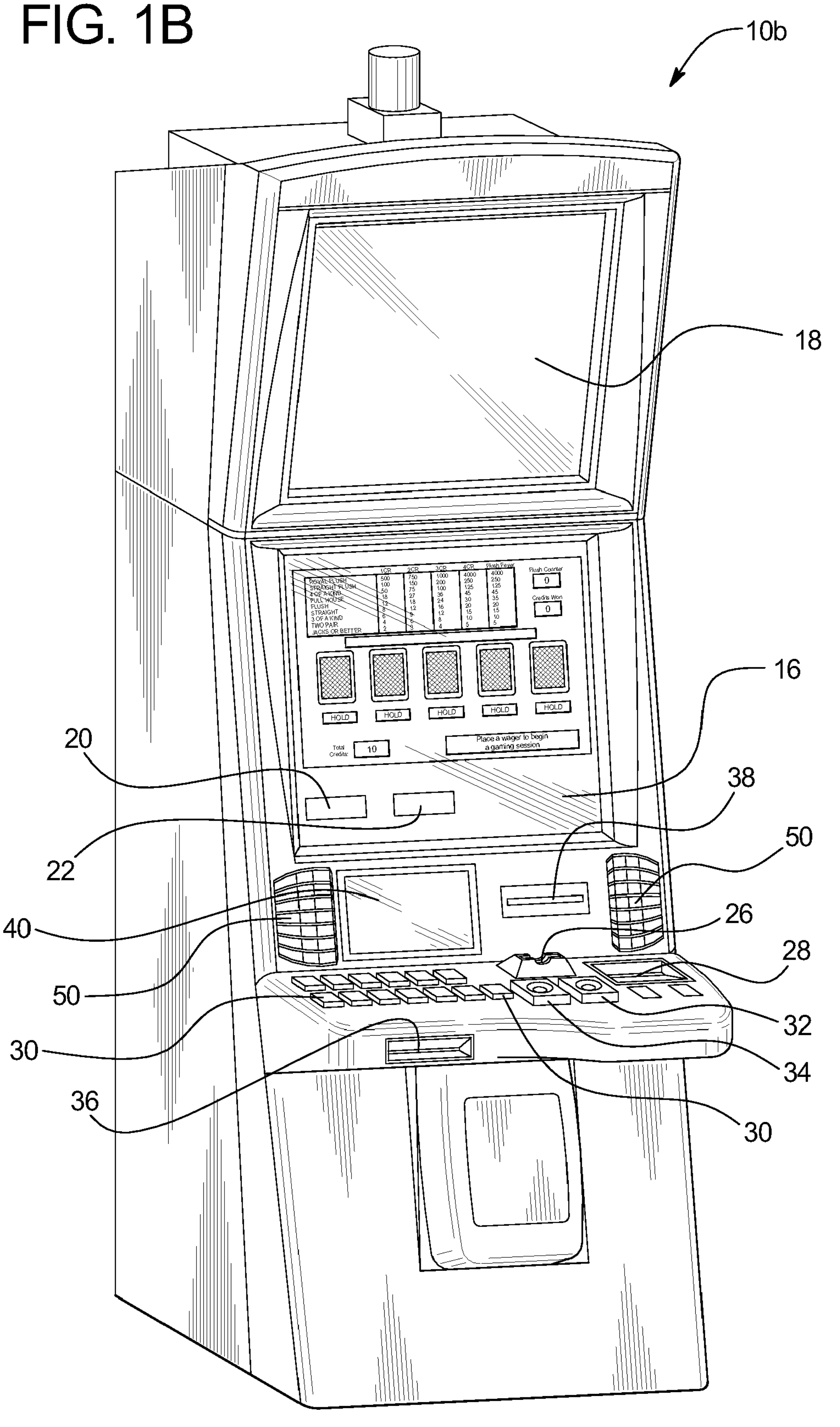

Referring now to the drawings, two example alternative embodiments of a gaming device disclosed herein are illustrated in FIGS. 1A and 1B as gaming device 10*a* and gaming device 10*b*, respectively. Gaming device 10*a* and/or gaming device 10*b* are generally referred to herein as gaming device 10.

In the embodiments illustrated in FIGS. 1A and 1B, gaming device 10 has a support structure, housing, or cabinet which provides support for a plurality of displays, inputs, controls, and other features of a conventional gaming machine. It is configured so that a player can operate it while standing or sitting. The gaming device can be positioned on a base or stand or can be configured as a pub-style table-top game (not shown) which a player can operate preferably while sitting. As illustrated by the different configurations shown in FIGS. 1A and 1B, the gaming device may have varying cabinet and display configurations.

Figure 2A:
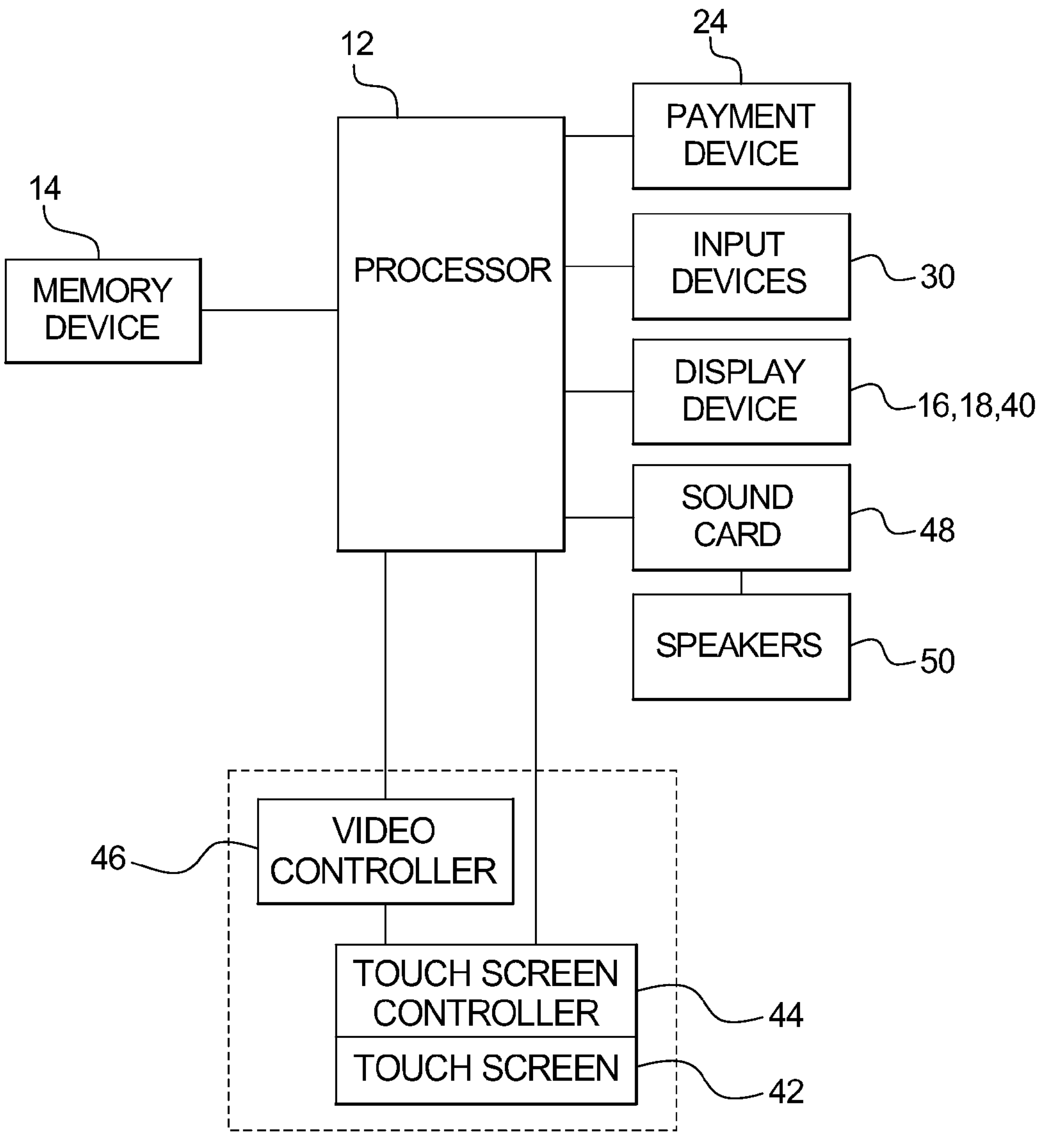
FIG. 2A is a schematic block diagram of one embodiment of an electronic configuration for one of the gaming devices disclosed herein.

In one embodiment, as illustrated in FIG. 2A, the gaming device preferably includes at least one processor 12, such as a microprocessor, a microcontroller-based platform, a suitable integrated circuit or one or more application-specific integrated circuits (ASIC's). The processor is in communication with or operable to access or to exchange signals with at least one data storage or memory device 14. In one embodiment, the processor and the memory device reside within the cabinet of the gaming device. The memory device stores program code and instructions, executable by the processor, to control the gaming device. The memory device also stores other data such as image data, event data, player input data, random or pseudo-random number generators, pay-table data or information, and applicable game rules that relate to the play of the gaming device. In one embodiment, the memory device includes random access memory (RAM), which can include non-volatile RAM (NVRAM), magnetic RAM (MRAM), ferroelectric RAM (FeRAM), and other forms as commonly understood in the gaming industry. In one embodiment, the memory device includes read only memory (ROM). In one embodiment, the memory device includes flash memory and/or EEPROM (electrically erasable programmable read only memory). Any other suitable magnetic, optical, and/or semiconductor memory may operate in conjunction with the gaming device disclosed herein.

In one embodiment, part or all of the program code and/or operating data described above can be stored in a detachable or removable memory device, including, but not limited to, a suitable cartridge, disk, CD ROM, DVD, or USB memory device. In other embodiments, part or all of the program code and/or operating data described above can be downloaded to the memory device through a suitable network.

In one embodiment, an operator or a player can use such a removable memory device in a desktop computer, a laptop computer, a personal digital assistant (PDA), a portable computing device, or another computerized platform to implement the present disclosure. In one embodiment, the gaming device or gaming machine disclosed herein is operable over a wireless network, for example part of a wireless gaming system. In this embodiment, the gaming machine may be a hand-held device, a mobile device, or any other suitable wireless device that enables a player to play any suitable game at a variety of different locations. It should be appreciated that a gaming device or gaming machine as disclosed herein may be a device that has obtained approval from a regulatory gaming commission or a device that has not obtained approval from a regulatory gaming commission. It should be appreciated that the processor and memory device may be collectively referred to herein as a “computer” or “controller.”

In one embodiment, as discussed in more detail below, the gaming device randomly generates awards and/or other game outcomes based on probability data. In one such embodiment, this random determination is provided through utilization of a random number generator (RNG), such as a true random number generator, a pseudo random number generator, or other suitable randomization process. In one embodiment, each award or other game outcome is associated with a probability and the gaming device generates the award or other game outcome to be provided to the player based on the associated probabilities. In this embodiment, since the gaming device generates outcomes randomly or based upon one or more probability calculations, there is no certainty that the gaming device will ever provide the player with any specific award or other game outcome.

In another embodiment, as discussed in more detail below, the gaming device employs a predetermined or finite set or pool of awards or other game outcomes. In this embodiment, as each award or other game outcome is provided to the player, the gaming device flags or removes the provided award or other game outcome from the predetermined set or pool. Once flagged or removed from the set or pool, the specific provided award or other game outcome from that specific pool cannot be provided to the player again. This type of gaming device provides players with all of the available awards or other game outcomes over the course of the play cycle and guarantees the amount of actual wins and losses.

In another embodiment, as discussed below, upon a player initiating game play at the gaming device, the gaming device enrolls in a bingo game. In this embodiment, a bingo server calls the bingo balls that result in a specific bingo game outcome. The resultant game outcome is communicated to the individual gaming device to be provided to a player. In one embodiment, this bingo outcome is displayed to the player as a bingo game and/or in any form in accordance with the present disclosure.

In one embodiment, as illustrated in FIG. 2A, the gaming device includes one or more display devices controlled by the processor. The display devices are preferably connected to or mounted on the cabinet of the gaming device. The embodiment shown in FIG. 1A includes a central display device 16 which displays a primary game. This display device may also display any suitable secondary game associated with the primary game as well as information relating to the primary or secondary game. The alternative embodiment shown in FIG. 1B includes a central display device 16 and an upper display device 18. The upper display device may display the primary game, any suitable secondary game associated or not associated with the primary game and/or information relating to the primary or secondary game. These display devices may also serve as digital glass operable to advertise games or other aspects of the gaming establishment. As seen in FIGS. 1A and 1B, in one embodiment, the gaming device includes a credit display 20 which displays a player’s current number of credits, cash, account balance, or the equivalent. In one embodiment, the gaming device includes a bet display 22 which displays a player’s amount wagered. In one embodiment, as described in more detail below, the gaming device includes a player tracking display 40 which displays information regarding a player’s play tracking status.

In another embodiment, at least one display device may be a mobile display device, such as a PDA or tablet PC, that enables play of at least a portion of the primary or secondary game at a location remote from the gaming device.

The display devices may include, without limitation, a monitor, a television display, a plasma display, a liquid crystal display (LCD) a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In one embodiment, as described in more detail below, the display device includes a touch-screen with an associated touch-screen controller. The display devices may be of any suitable size and configuration, such as a square, a rectangle or an elongated rectangle.

The display devices of the gaming device are configured to display at least one and preferably a plurality of game or other suitable images, symbols and indicia such as any visual representation or exhibition of the movement of objects such as mechanical, virtual, or video reels and wheels, dynamic lighting, video images, images of people, characters, places, things, faces of cards, and the like.

In one alternative embodiment, the symbols, images and indicia displayed on or of the display device may be in mechanical form. That is, the display device may include any electromechanical device, such as one or more mechanical objects, such as one or more rotatable wheels, reels, or dice, configured to display at least one or a plurality of game or other suitable images, symbols or indicia.

As illustrated in FIG. 2A, in one embodiment, the gaming device includes at least one payment device 24 in communication with the processor. As seen in FIGS. 1A and 1B, a payment device such as a payment acceptor includes a note, ticket or bill acceptor 28 wherein the player inserts paper money, a ticket, or voucher and a coin slot 26 where the player inserts money, coins, or tokens. In other embodiments, payment devices such as readers or validators for credit cards, debit cards or credit slips may accept payment. In one embodiment, a player may insert an identification card into a card reader of the gaming device. In one embodiment, the identification card is a smart card having a programmed microchip, a coded magnetic strip or coded rewritable magnetic strip, wherein the programmed microchip or magnetic strips are coded with a player's identification, credit totals (or related data), and/or other relevant information. In another embodiment, a player may carry a portable device, such as a cell phone, a radio frequency identification tag, or any other suitable wireless device, which communicates a player's identification, credit totals (or related data), and other relevant information to the gaming device. In one embodiment, money may be transferred to a gaming device through electronic funds transfer. When a player funds the gaming device, the processor determines the amount of funds entered and displays the corresponding amount on the credit or other suitable display as described above.

As seen in FIGS. 1A, 1B, and 2A, in one embodiment the gaming device includes at least one and preferably a plurality of input devices 30 in communication with the processor. The input devices can include any suitable device which enables the player to produce an input signal which is received by the processor. In one embodiment, after appropriate funding of the gaming device, the input device is a game activation device, such as a play button 32 or a pull arm (not shown) which is used by the player to start any primary game or sequence of events in the gaming device. The play button can be any suitable play activator such as a bet one button, a max bet button, or a repeat the bet button. In one embodiment, upon appropriate funding, the gaming device begins the game play automatically. In another embodiment, upon the player engaging one of the play buttons, the gaming device automatically activates game play.

In one embodiment, one input device is a bet one button. The player places a bet by pushing the bet one button. The player can increase the bet by one credit each time the player pushes the bet one button. When the player pushes the bet one button, the number of credits shown in the credit display preferably decreases by one, and the number of credits shown in the bet display preferably increases by one. In another embodiment, one input device is a bet max button (not shown) which enables the player to bet the maximum wager permitted for a game of the gaming device.

In one embodiment, one input device is a cash out button 34. The player may push the cash out button and cash out to receive a cash payment or other suitable form of payment corresponding to the number of remaining credits. In one embodiment, when the player cashes out, a payment device, such as a ticket, payment, or note generator 36 prints or otherwise generates a ticket or credit slip to provide to the player. The player receives the ticket or credit slip and may redeem the value associated with the ticket or credit slip via a cashier (or other suitable redemption system). In another embodiment, when the player cashes out, the player receives the coins or tokens in a coin payout tray. It should be appreciated that any suitable payout mechanisms, such as funding to the player's electronically recordable identification card or smart card, may be implemented in accordance with the gaming device disclosed herein.

In one embodiment, as mentioned above and as seen in FIG. 2A, one input device is a touch-screen 42 coupled with a touch-screen controller 44 or some other touch-sensitive display overlay to allow for player interaction with the images on the display. The touch-screen and the touch-screen controller are connected to a video controller 46. A player can make decisions and input signals into the gaming device by touching the touch-screen at the appropriate locations. One such input device is a conventional touch-screen button panel.

The gaming device may further include a plurality of communication ports for enabling communication of the processor with external peripherals, such as external video sources, expansion buses, game or other displays, a SCSI port, or a keypad.

In one embodiment, as seen in FIG. 2A, the gaming device includes a sound generating device controlled by one or more sounds cards 48 which function in conjunction with the processor. In one embodiment, the sound generating device includes at least one and preferably a plurality of speakers 50 or other sound generating hardware and/or software for generating sounds, such as by playing music for the primary and/or secondary game or by playing music for other modes of the gaming device, such as an attract mode. In one embodiment, the gaming device provides dynamic sounds coupled with attractive multimedia images displayed on one or more of the display devices to provide an audio-visual representation or to otherwise display full-motion video with sound to attract players to the gaming device. During idle periods, the gaming device may display a sequence of audio and/or visual attraction messages to attract potential players to the gaming device. The videos may also be customized to provide any appropriate information.

In one embodiment, the gaming machine may include a sensor, such as a camera, in communication with the processor (and possibly controlled by the processor), that is selectively positioned to acquire an image of a player actively using the gaming device and/or the surrounding area of the gaming device. In one embodiment, the camera may be configured to selectively acquire still or moving (e.g., video) images and may be configured to acquire the images in an analog, digital, or other suitable format. The display devices may be configured to display the image acquired by the camera as well as to display the visible manifestation of the game in split screen or picture-in-picture fashion. For example, the camera may acquire an image of the player and the processor may incorporate that image into the primary and/or secondary game as a game image, symbol or indicia.

Gaming device 10 can incorporate any suitable wagering game as the primary or base game. The gaming machine or device may include some or all of the features of conventional gaming machines or devices. The primary or base game may comprise any suitable reel-type game, card game, cascading or falling symbol game, number game, or other game of chance susceptible to representation in an electronic or electromechanical form, which in one embodiment produces a random outcome based on probability data at the time of or after placement of a wager. That is, different primary wagering games, such as video poker games, video blackjack games, video keno, video bingo or any other suitable primary or base game may be implemented.

In one embodiment, a base or primary game may be a slot game with one or more paylines. The paylines may be horizontal, vertical, circular, diagonal, angled or any combination thereof. In this embodiment, the gaming device includes at least one and preferably a plurality of reels, such as three to five reels, in either electromechanical form with mechanical rotating reels or video form with simulated reels and movement thereof. In one embodiment, an electromechanical slot machine includes a plurality of adjacent, rotatable reels which may be combined and operably coupled with an electronic display of any suitable type. In another embodiment, if the reels are in video form, one or more of the display devices, as described above, displays the plurality of simulated video reels. Each reel displays a plurality of indicia or symbols, such as bells, hearts, fruits, numbers, letters, bars, or other images which preferably correspond to a theme associated with the gaming device. In another embodiment, one or more of the reels are independent reels or unisymbol reels. In this embodiment, each independent or unisymbol reel generates and displays one symbol to the player. In one embodiment, the gaming device awards prizes after the reels of the primary game stop spinning if specified types and/or configurations of indicia or symbols occur on an active payline or otherwise occur in a winning pattern, occur on the requisite number of adjacent reels and/or occur in a scatter pay arrangement.

In an alternative embodiment, rather than determining any outcome to provide to the player by analyzing the symbols generated on any wagered upon paylines as described above, the gaming device determines any outcome to provide to the player based on the number of associated symbols which are generated in active symbol positions on the requisite number of adjacent reels (i.e., not on paylines passing through any displayed winning symbol combinations). In this embodiment, if a winning symbol combination is generated on the reels, the gaming device provides the player one award for that occurrence of the generated winning symbol combination. For example, if one winning symbol combination is generated on the reels, the gaming device will provide a single award to the player for that winning symbol combination (i.e., not based on the number of paylines that would have passed through that winning symbol combination). It should be appreciated that because a gaming device that enables wagering on ways to win provides the player one award for a single occurrence of a winning symbol combination and a gaming device with paylines may provide the player more than one award for the same occurrence of a single winning symbol combination (i.e., if a plurality of paylines each pass through the same winning symbol combination), it is possible to provide a player at a ways to win gaming device with more ways to win for an equivalent bet or wager on a traditional slot gaming device with paylines.

In one embodiment, the total number of ways to win is determined by multiplying the number of symbols generated in active symbol positions on a first reel by the number of symbols generated in active symbol positions on a second reel by the number of symbols generated in active symbol positions on a third reel and so on for each reel of the gaming device with at least one symbol generated in an active symbol position. For example, a three reel gaming device with three symbols generated in active symbol positions on each reel includes 27 ways to win (i.e., 3 symbols on the first reel×3 symbols on the second reel×3 symbols on the third reel). A four reel gaming device with three symbols generated in active symbol positions on each reel includes 81 ways to win (i.e., 3 symbols on the first reel×3 symbols on the second reel×3 symbols on the third reel×3 symbols on the fourth reel). A five reel gaming device with three symbols generated in active symbol positions on each reel includes 243 ways to win (i.e., 3 symbols on the first reel×3 symbols on the second reel×3 symbols on the third reel×3 symbols on the fourth reel×3 symbols on the fifth reel). It should be appreciated that modifying the number of generated symbols by either modifying the number of reels or modifying the number of symbols generated in active symbol positions by one or more of the reels modifies the number of ways to win.

In another embodiment, the gaming device enables a player to wager on and thus activate symbol positions. In one such embodiment, the symbol positions are on the reels. In this embodiment, if based on the player's wager, a reel is activated, then each of the symbol positions of that reel will be activated and each of the active symbol positions will be part of one or more of the ways to win. In one embodiment, if based on the player's wager, a reel is not activated, then a designated number of default symbol positions, such as a single symbol position of the middle row of the reel, will be activated and the default symbol position(s) will be part of one or more of the ways to win. This type of gaming machine enables a player to wager on one, more than one or all of the reels and the processor of the gaming device uses the number of wagered on reels to determine the active symbol positions and the number of possible ways to win. In alternative embodiments, (1) no symbols are displayed as generated at any of the inactive symbol positions, or (2) any symbols generated at any inactive symbol positions may be displayed to the player but suitably shaded or otherwise designated as inactive.

In one embodiment wherein a player wagers on one or more reels, a player's wager of one credit may activate each of the three symbol positions on a first reel, wherein one default symbol position is activated on each of the remaining four reels. In this example, as described above, the gaming device provides the player three ways to win (i.e., 3 symbols on the first reel×1 symbol on the second reel×1 symbol on the third reel×1 symbol on the fourth reel×1 symbol on the fifth reel). In another example, a player's wager of nine credits may activate each of the three symbol positions on a first reel, each of the three symbol positions on a second reel and each of the three symbol positions on a third reel wherein one default symbol position is activated on each of the remaining two reels. In this example, as described above, the gaming device provides the player twenty-seven ways to win (i.e., 3 symbols on the first reel×3 symbols on the second reel×3 symbols on the third reel×1 symbol on the fourth reel×1 symbol on the fifth reel).

In one embodiment, to determine any award(s) to provide to the player based on the generated symbols, the gaming device individually determines if a symbol generated in an active symbol position on a first reel forms part of a winning symbol combination with or is otherwise suitably related to a symbol generated in an active symbol position on a second reel. In this embodiment, the gaming device classifies each pair of symbols which form part of a winning symbol combination (i.e., each pair of related symbols) as a string of related symbols. For example, if active symbol positions include a first cherry symbol generated in the top row of a first reel and a second cherry symbol generated in the bottom row of a second reel, the gaming device classifies the two cherry symbols as a string of related symbols because the two cherry symbols form part of a winning symbol combination.

After determining if any strings of related symbols are formed between the symbols on the first reel and the symbols on the second reel, the gaming device determines if any of the symbols from the next adjacent reel should be added to any of the formed strings of related symbols. In this embodiment, for a first of the classified strings of related symbols, the gaming device determines if any of the symbols generated by the next adjacent reel form part of a winning symbol combination or are otherwise related to the symbols of the first string of related symbols. If the gaming device determines that a symbol generated on the next adjacent reel is related to the symbols of the first string of related symbols, that symbol is subsequently added to the first string of related symbols. For example, if the first string of related symbols is the string of related cherry symbols and a related cherry symbol is generated in the middle row of the third reel, the gaming device adds the related cherry symbol generated on the third reel to the previously classified string of cherry symbols.

On the other hand, if the gaming device determines that no symbols generated on the next adjacent reel are related to the symbols of the first string of related symbols, the gaming device marks or flags such string of related symbols as complete. For example, if the first string of related symbols is the string of related cherry symbols and none of the symbols of the third reel are related to the cherry symbols of the previously classified string of cherry symbols, the gaming device marks or flags the string of two cherry symbols as complete.

After either adding a related symbol to the first string of related symbols or marking the first string of related symbols as complete, the gaming device proceeds as described above for each of the remaining classified strings of related symbols which were previously classified or formed from related symbols on the first and second reels.

After analyzing each of the remaining strings of related symbols, the gaming device determines, for each remaining pending or incomplete string of related symbols, if any of the symbols from the next adjacent reel, if any, should be added to any of the previously classified strings of related symbols. This process continues until either each string of related symbols is complete or there are no more adjacent reels of symbols to analyze. In this embodiment, where there are no more adjacent reels of symbols to analyze, the gaming device marks each of the remaining pending strings of related symbols as complete.

When each of the strings of related symbols is marked complete, the gaming device compares each of the strings of related symbols to an appropriate paytable and provides the player any award associated with each of the completed strings of symbols. It should be appreciated that the player is provided one award, if any, for each string of related symbols generated in active symbol positions (i.e., as opposed to a quantity of awards being based on how many paylines that would have passed through each of the strings of related symbols in active symbol positions).

In one embodiment, as illustrated in FIGS. 1A and 1B, a base or primary game may be a poker game wherein the gaming device enables the player to play a conventional game of video draw poker and initially deals five cards all face up from a virtual deck of fifty-two cards. Cards may be dealt as in a traditional game of cards or in the case of the gaming device, the cards may be randomly selected from a predetermined number of cards. If the player wishes to draw, the player selects the cards to hold via one or more input devices, such as by pressing related hold buttons or via the touch screen. The player then presses the deal button and the unwanted or discarded cards are removed from the display and the gaming machine deals the replacement cards from the remaining cards in the deck. This results in a final five-card hand. The gaming device compares the final five-card hand to a payout table which utilizes conventional poker hand rankings to determine the winning hands. The gaming device provides the player with an award based on a winning hand and the number of credits the player wagered.

In another embodiment, the base or primary game may be a multi-hand version of video poker. In this embodiment, the gaming device deals the player at least two hands of cards. In one such embodiment, the cards are the same cards. In one embodiment each hand of cards is associated with its own deck of cards. The player chooses the cards to hold in a primary hand. The held cards in the primary hand are also held in the other hands of cards. The remaining non-held cards are removed from each hand displayed and for each hand replacement cards are randomly dealt into that hand. Since the replacement cards are randomly dealt independently for each hand, the replacement cards for each hand will usually be different. The poker hand rankings are then determined hand by hand against a payout table and awards are provided to the player.

In one embodiment, a base or primary game may be a keno game wherein the gaming device displays a plurality of selectable indicia or numbers on at least one of the display devices. In this embodiment, the player selects at least one bit potentially a plurality of the selectable indicia or numbers via an input device such as a touch screen. The gaming device then displays a series of drawn numbers and determine an amount of matches, if any, between the player's selected numbers and the gaming device's drawn numbers. The player is provided an award based on the amount of matches, if any, based on the amount of determined matches and the number of numbers drawn.

In one embodiment, in addition to winning credits or other awards in a base or primary game, the gaming device may also give players the opportunity to win credits in a bonus or secondary game or in a bonus or secondary round. The bonus or secondary game enables the player to obtain a prize or payout in addition to the prize or payout, if any, obtained from the base or primary game. In general, a bonus or secondary game produces a significantly higher level of player excitement than the base or primary game because it provides a greater expectation of winning than the base or primary game, and is accompanied with more attractive or unusual features than the base or primary game. In one embodiment, the bonus or secondary game may be any type of suitable game, either similar to or completely different from the base or primary game.

In one embodiment, the triggering event or qualifying condition may be a selected outcome in the primary game or a particular arrangement of one or more indicia on a display device in the primary game. In other embodiments, the triggering event or qualifying condition occurs based on exceeding a certain amount of game play (such as number of games, number of credits, amount of time), or reaching a specified number of points earned during game play.

In another embodiment, the gaming device processor 12 or central controller 56 randomly provides the player one or more plays of one or more secondary games. In one such embodiment, the gaming device does not provide any apparent reason to the player for qualifying to play a secondary or bonus game. In this embodiment, qualifying for a bonus game is not triggered by an event in or based specifically on any of the plays of any primary game. That is, the gaming device may simply qualify a player to play a secondary game without any explanation or alternatively with simple explanations. In another embodiment, the gaming device (or central server) qualifies a player for a secondary game at least partially based on a game triggered or symbol triggered event, such as at least partially based on the play of a primary game.

In one embodiment, the gaming device includes a program which will automatically begin a bonus round after the player has achieved a triggering event or qualifying condition in the base or primary game. In another embodiment, after a player has qualified for a bonus game, the player may subsequently enhance his/her bonus game participation through continued play on the base or primary game. Thus, for each bonus qualifying event, such as a bonus symbol, that the player obtains, a given number of bonus game wagering points or credits may be accumulated in a "bonus meter" programmed to accrue the bonus wagering credits or entries toward eventual participation in a bonus game. The occurrence of multiple such bonus qualifying events in the primary game may result in an arithmetic or exponential increase in the number of bonus wagering credits awarded. In one embodiment, the player may redeem extra bonus wagering credits during the bonus game to extend play of the bonus game.

In one embodiment, no separate entry fee or buy-in for a bonus game is needed. That is, a player may not purchase entry into a bonus game; rather they must win or earn entry through play of the primary game, thus encouraging play of the primary game. In another embodiment, qualification of the bonus or secondary game is accomplished through a simple "buy-in" by the player—for example, if the player has been unsuccessful at qualifying through other specified activities. In another embodiment, the player must make a separate side-wager on the bonus game or wager a designated amount in the primary game to qualify for the secondary game. In this embodiment, the secondary game triggering event must occur and the side-wager (or designated primary game wager amount) must have been placed to trigger the secondary game.

Figure 2B:
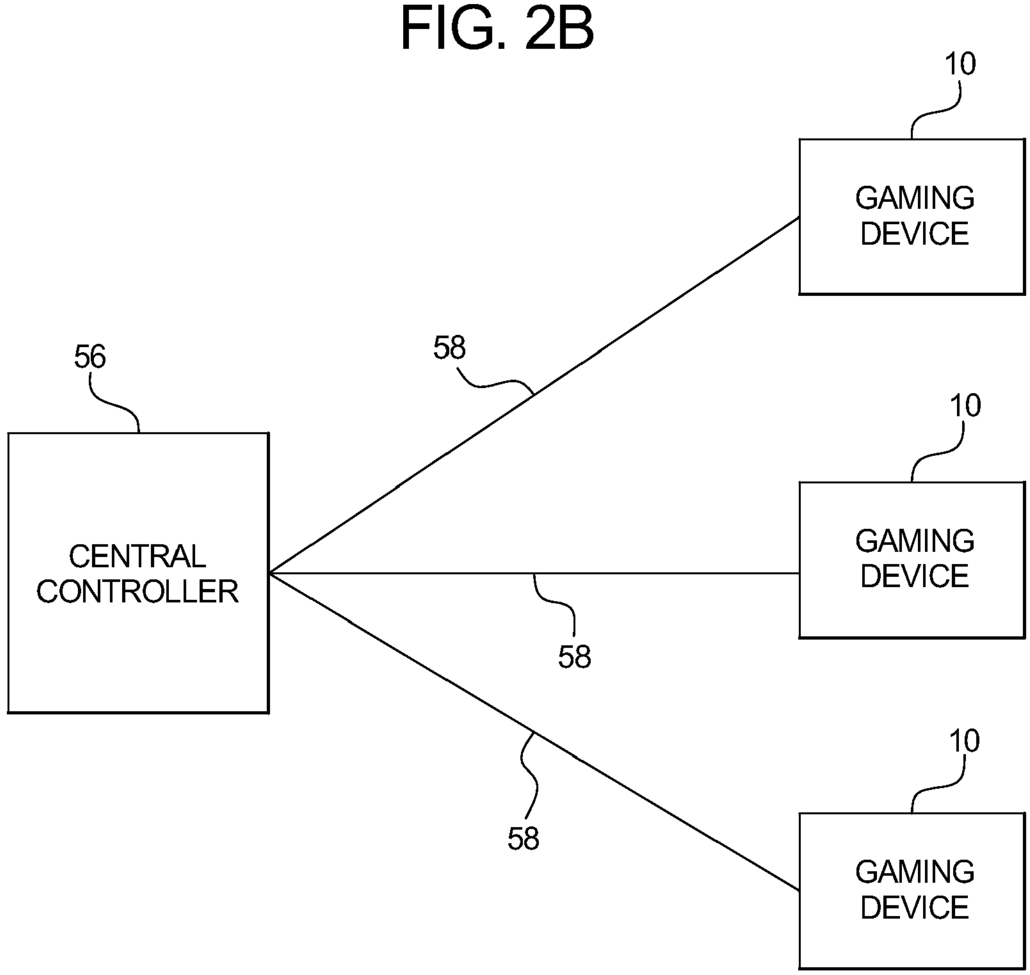
FIG. 2B is a schematic block diagram of one embodiment of a network configuration of a plurality of gaming devices disclosed herein.

In one embodiment, as illustrated in FIG. 2B, one or more of the gaming devices 10 are in communication with each other and/or at least one central controller 56 through a data network or remote communication link 58. In this embodiment, the central server, central controller or remote host is any suitable server or computing device which includes at least one processor and at least one memory or storage device. In different such embodiments, the central server is a progressive controller or a processor of one of the gaming devices in the gaming system. In these embodiments, the processor of each gaming device is designed to transmit and receive events, messages, commands, or any other suitable data or signal between the individual gaming device and the central server. The gaming device processor is operable to execute such communicated events, messages, or commands in conjunction with the operation of the gaming device. Moreover, the processor of the central server is designed to transmit and receive events, messages, commands, or any other suitable data or signal between the central server and each of the individual gaming devices. The central server processor is operable to execute such communicated events, messages, or commands in conjunction with the operation of the central server. It should be appreciated that one, more or each of the functions of the central controller, central server or remote host as disclosed herein may be performed by one or more gaming device processors. It should be further appreciated that one, more or each of the functions of one or more gaming device processors as disclosed herein may be performed by the central controller, central server or remote host.

In one embodiment, the game outcome provided to the player is determined by a central server or controller and provided to the player at the gaming device. In this embodiment, each of a plurality of such gaming devices are in communication with the central server or controller. Upon a player initiating game play at one of the gaming devices, the initiated gaming device communicates a game outcome request to the central server or controller.

In one embodiment, the central server or controller receives the game outcome request and randomly generates a game outcome for the primary game based on probability data. In another embodiment, the central server or controller randomly generates a game outcome for the secondary game based on probability data. In another embodiment, the central server or controller randomly generates a game outcome for both the primary game and the secondary game based on probability data. In this embodiment, the central server or controller is capable of storing and utilizing program code or other data similar to the processor and memory device of the gaming device.

In an alternative embodiment, the central server or controller maintains one or more predetermined pools or sets of predetermined game outcomes. In this embodiment, the central server or controller receives the game outcome request and independently selects a predetermined game outcome from a set or pool of game outcomes. The central server or controller flags or marks the selected game outcome as used. Once a game outcome is flagged as used, it is prevented from further selection from the set or pool and cannot be selected by the central controller or server upon another wager. The provided game outcome can include a primary game outcome, a secondary game outcome, primary and secondary game outcomes, or a series of game outcomes such as free games.

The central server or controller communicates the generated or selected game outcome to the initiated gaming device. The gaming device receives the generated or selected game outcome and provides the game outcome to the player. In an alternative embodiment, how the generated or selected game outcome is to be presented or displayed to the player, such as a reel symbol combination of a slot machine or a hand of cards dealt in a card game, is also determined by the central server or controller and communicated to the initiated gaming device to be presented or displayed to the player. Central production or control can assist a gaming establishment or other entity in maintaining appropriate records, controlling gaming, reducing and preventing cheating or electronic or other errors, reducing or eliminating win-loss volatility, and the like.

In another embodiment, a predetermined game outcome value is determined for each of a plurality of linked or networked gaming devices based on the results of a bingo, keno, or lottery game. In this embodiment, each individual gaming device utilizes one or more bingo, keno, or lottery games to determine the predetermined game outcome value provided to the player for the interactive game played at that gaming device. In one embodiment, the bingo, keno, or lottery game is displayed to the player. In another embodiment, the bingo, keno or lottery game is not displayed to the player, but the results of the bingo, keno, or lottery game determine the predetermined game outcome value for the primary or secondary game.

In the various bingo embodiments, as each gaming device is enrolled in the bingo game, such as upon an appropriate wager or engaging an input device, the enrolled gaming device is provided or associated with a different bingo card. Each bingo card consists of a matrix or array of elements, wherein each element is designated with a separate indicia, such as a number. It should be appreciated that each different bingo card includes a different combination of elements. For example, if four bingo cards are provided to four enrolled gaming devices, the same element may be present on all four of the bingo cards while another element may solely be present on one of the bingo cards.

In operation of these embodiments, upon providing or associating a different bingo card with each of a plurality of enrolled gaming devices, the central controller randomly selects or draws, one at a time, a plurality of the elements. As each element is selected, a determination is made for each gaming device as to whether the selected element is present on the bingo card provided to that enrolled gaming device. This determination can be made by the central controller, the gaming device, a combination of the two, or in any other suitable manner. If the selected element is present on the bingo card provided to that enrolled gaming device, that selected element on the provided bingo card is marked or flagged. This process of selecting elements and marking any selected elements on the provided bingo cards continues until one or more predetermined patterns are marked on one or more of the provided bingo cards. It should be appreciated that in one embodiment, the gaming device requires the player to engage a daub button (not shown) to initiate the process of the gaming device marking or flagging any selected elements.

After one or more predetermined patterns are marked on one or more of the provided bingo cards, a game outcome is determined for each of the enrolled gaming devices based, at least in part, on the selected elements on the provided bingo cards. As described above, the game outcome determined for each gaming device enrolled in the bingo game is utilized by that gaming device to determine the predetermined game outcome provided to the player. For example, a first gaming device to have selected elements marked in a predetermined pattern is provided a first outcome of win $10 which will be provided to a first player regardless of how the first player plays in a first game, and a second gaming device to have selected elements marked in a different predetermined pattern is provided a second outcome of win $2 which will be provided to a second player regardless of how the second player plays a second game. It should be appreciated that as the process of marking selected elements continues until one or more predetermined patterns are marked, this embodiment ensures that at least one bingo card will win the bingo game and thus at least one enrolled gaming device will provide a predetermined winning game outcome to a player. It should be appreciated that other suitable methods for selecting or determining one or more predetermined game outcomes may be employed.

In one example of the above-described embodiment, the predetermined game outcome may be based on a supplemental award in addition to any award provided for winning the bingo game as described above. In this embodiment, if one or more elements are marked in supplemental patterns within a designated number of drawn elements, a supplemental or intermittent award or value associated with the marked supplemental pattern is provided to the player as part of the predetermined game outcome. For example, if the four corners of a bingo card are marked within the first twenty selected elements, a supplemental award of $10 is provided to the player as part of the predetermined game outcome. It should be appreciated that in this embodiment, the player of a gaming device may be provided a supplemental or intermittent award regardless of whether the enrolled gaming device's provided bingo card wins or does not win the bingo game as described above.

In another embodiment, one or more of the gaming devices are in communication with a central server or controller for monitoring purposes only. That is, each individual gaming device randomly generates the game outcomes to be provided to the player and the central server or controller monitors the activities and events occurring on the plurality of gaming devices. In one embodiment, the gaming network includes a real-time or on-line accounting and gaming information system operably coupled to the central server or controller. The accounting and gaming information system of this embodiment includes a player database for storing player profiles, a player tracking module for tracking players and a credit system for providing automated casino transactions.

In one embodiment, the gaming device disclosed herein is associated with or otherwise integrated with one or more player tracking systems. Player tracking systems enable gaming establishments to recognize the value of customer loyalty through identifying frequent customers and rewarding them for their patronage. In one embodiment, the gaming device and/or player tracking system tracks any player's gaming activity at the gaming device. In one such embodiment, the gaming device includes at least one card reader 38 in communication with the processor. In this embodiment, a player is issued a player identification card which has an encoded player identification number that uniquely identifies the player. When a player inserts their playing tracking card into the card reader to begin a gaming session, the card reader reads the player identification number off the player tracking card to identify the player. The gaming device and/or associated player tracking system timely tracks any suitable information or data relating to the identified player's gaming session. Directly or via the central controller, the gaming device processor communicates such information to the player tracking system. The gaming device and/or associated player tracking system also timely tracks when a player removes their player tracking card when concluding play for that gaming session. In another embodiment, rather than requiring a player to insert a player tracking card, the gaming device utilizes one or more portable devices carried by a player, such as a cell phone, a radio frequency identification tag or any other suitable wireless device to track when a player begins and ends a gaming session. In another embodiment, the gaming device utilizes any suitable biometric technology or ticket technology to track when a player begins and ends a gaming session.

During one or more gaming sessions, the gaming device and/or player tracking system tracks any suitable information or data, such as any amounts wagered, average wager amounts, and/or the time at which these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In one embodiment, such tracked information and/or any suitable feature associated with the player tracking system is displayed on a player tracking display 40. In another embodiment, such tracked information and/or any suitable feature associated with the player tracking system is displayed via one or more service windows (not shown) which are displayed on the central display device and/or the upper display device.

In one embodiment, a plurality of the gaming devices are capable of being connected together through a data network. In one embodiment, the data network is a local area network (LAN), in which one or more of the gaming devices are substantially proximate to each other and an on-site central server or controller as in, for example, a gaming establishment or a portion of a gaming establishment. In another embodiment, the data network is a wide area network (WAN) in which one or more of the gaming devices are in communication with at least one off-site central server or controller. In this embodiment, the plurality of gaming devices may be located in a different part of the gaming establishment or within a different gaming establishment than the off-site central server or controller. Thus, the WAN may include an off-site central server or controller and an off-site gaming device located within gaming establishments in the same geographic area, such as a city or state. The WAN gaming system may be substantially identical to the LAN gaming system described above, although the number of gaming devices in each system may vary relative to one another.

In another embodiment, the data network is an internet or intranet. In this embodiment, the operation of the gaming device can be viewed at the gaming device with at least one internet browser. In this embodiment, operation of the gaming device and accumulation of credits may be accomplished with only a connection to the central server or controller (the internet/intranet server) through a conventional phone or other data transmission line, digital subscriber line (DSL), T-1 line, coaxial cable, fiber optic cable, or other suitable connection. In this embodiment, players may access an internet game page from any location where an internet connection and computer or other internet facilitator is available. The expansion in the number of computers and number and speed of internet connections in recent years increases opportunities for players to play from an ever-increasing number of remote sites. It should be appreciated that the enhanced bandwidth of digital wireless communications may render such technology suitable for some or all communications, particularly if such communications are encrypted. Higher data transmission speeds may be useful for enhancing the sophistication and response of the display and interaction with the player.

As mentioned above, in one embodiment, the present disclosure may be employed in a server-based gaming system. In one such embodiment, as described above, one or more gaming devices are in communication with a central server or controller. The central server or controller may be any suitable server or computing device which includes at least one processor and a memory or storage device. In alternative embodiments, the central server is a progressive controller or another gaming machine in the gaming system. In one embodiment, the memory device of the central server stores different game programs and instructions, executable by a gaming device processor, to control the gaming device. Each executable game program represents a different game or type of game which may be played on one or more of the gaming devices in the gaming system. Such different games may include the same or substantially the same game play with different pay tables. In different embodiments, the executable game program is for a primary game, a secondary game or both. In another embodiment, the game program may be executable as a secondary game to be played simultaneous with the play of a primary game (which may be downloaded to or fixed on the gaming device) or vice versa.

In this embodiment, each gaming device at least includes one or more display devices and/or one or more input devices for interaction with a player. A local processor, such as the above-described gaming device processor or a processor of a local server, is operable with the display device(s) and/or the input device(s) of one or more of the gaming devices.

In operation, the central controller is operable to communicate one or more of the stored game programs to at least one local processor. In different embodiments, the stored game programs are communicated or delivered by embedding the communicated game program in a device or a component (e.g., a microchip to be inserted in a gaming device), writing the game program on a disc or other media, or downloading or streaming the game program over a dedicated data network, internet, or a telephone line. After the stored game programs are communicated from the central server, the local processor executes the communicated program to facilitate play of the communicated program by a player through the display device(s) and/or input device(s) of the gaming device. That is, when a game program is communicated to a local processor, the local processor changes the game or type of game played at the gaming device.

In another embodiment, a plurality of gaming devices at one or more gaming sites may be networked to the central server in a progressive configuration, as known in the art, wherein a portion of each wager to initiate a base or primary game may be allocated to one or more progressive awards. In one embodiment, a progressive gaming system host site computer is coupled to a plurality of the central servers at a variety of mutually remote gaming sites for providing a multi-site linked progressive automated gaming system. In one embodiment, a progressive gaming system host site computer may serve gaming devices distributed throughout a number of properties at different geographical locations including, for example, different locations within a city or different cities within a state.

In one embodiment, the progressive gaming system host site computer is maintained for the overall operation and control of the progressive gaming system. In this embodiment, a progressive gaming system host site computer oversees the entire progressive gaming system and is the master for computing all progressive jackpots. All participating gaming sites report to, and receive information from, the progressive gaming system host site computer. Each central server computer is responsible for all data communication between the gaming device hardware and software and the progressive gaming system host site computer. In one embodiment, an individual gaming machine may trigger a progressive award win. In another embodiment, a central server (or the progressive gaming system host site computer) determines when a progressive award win is triggered. In another embodiment, an individual gaming machine and a central controller (or progressive gaming system host site computer) work in conjunction with each other to determine when a progressive win is triggered, for example through an individual gaming machine meeting a predetermined requirement established by the central controller.

In one embodiment, a progressive award win is triggered based on one or more game play events, such as a symbol-driven trigger. In other embodiments, the progressive award triggering event or qualifying condition may be achieved by exceeding a certain amount of game play (such as number of games, number of credits, or amount of time), or reaching a specified number of points earned during game play. In another embodiment, a gaming device is randomly or apparently randomly selected to provide a player of that gaming device one or more progressive awards. In one such embodiment, the gaming device does not provide any apparent reasons to the player for winning a progressive award, wherein winning the progressive award is not triggered by an event in or based specifically on any of the plays of any primary game. That is, a player is provided a progressive award without any explanation or alternatively with simple explanations. In another embodiment, a player is provided a progressive award at least partially based on a game triggered or symbol triggered event, such as at least partially based on the play of a primary game.

In one embodiment, one or more of the progressive awards are each funded via a side bet or side wager. In this embodiment, a player must place or wager a side bet to be eligible to win the progressive award associated with the side bet. In one embodiment, the player must place the maximum bet and the side bet to be eligible to win one of the progressive awards. In another embodiment, if the player places or wagers the required side bet, the player may wager at any credit amount during the primary game (i.e., the player need not place the maximum bet and the side bet to be eligible to win one of the progressive awards). In one such embodiment, the greater the player's wager (in addition to the placed side bet), the greater the odds or probability that the player will win one of the progressive awards. It should be appreciated that one or more of the progressive awards may each be funded, at least in part, based on the wagers placed on the primary games of the gaming machines in the gaming system, via a gaming establishment or via any suitable manner.

In another embodiment, one or more of the progressive awards are partially funded via a side-bet or side-wager which the player may make (and which may be tracked via a side-bet meter). In one embodiment, one or more of the progressive awards are funded with only side-bets or side-wagers placed. In another embodiment, one or more of the progressive awards are funded based on player's wagers as described above as well as any side-bets or side-wagers placed.

In one alternative embodiment, a minimum wager level is required for a gaming device to qualify to be selected to obtain one of the progressive awards. In one embodiment, this minimum wager level is the maximum wager level for the primary game in the gaming machine. In another embodiment, no minimum wager level is required for a gaming machine to qualify to be selected to obtain one of the progressive awards.

In another embodiment, a plurality of players at a plurality of linked gaming devices in a gaming system participate in a group gaming environment. In one embodiment, a plurality of players at a plurality of linked gaming devices work in conjunction with one another, such as by playing together as a team or group, to win one or more awards. In one such embodiment, any award won by the group is shared, either equally or based on any suitable criteria, amongst the different players of the group. In another embodiment, a plurality of players at a plurality of linked gaming devices compete against one another for one or more awards. In one such embodiment, a plurality of players at a plurality of linked gaming devices participate in a gaming tournament for one or more awards. In another embodiment, a plurality of players at a plurality of linked gaming devices play for one or more awards wherein an outcome generated by one gaming device affects the outcomes generated by one or more linked gaming devices.

Bonus Gaming Session Re-Draw Embodiments

Figure 3:
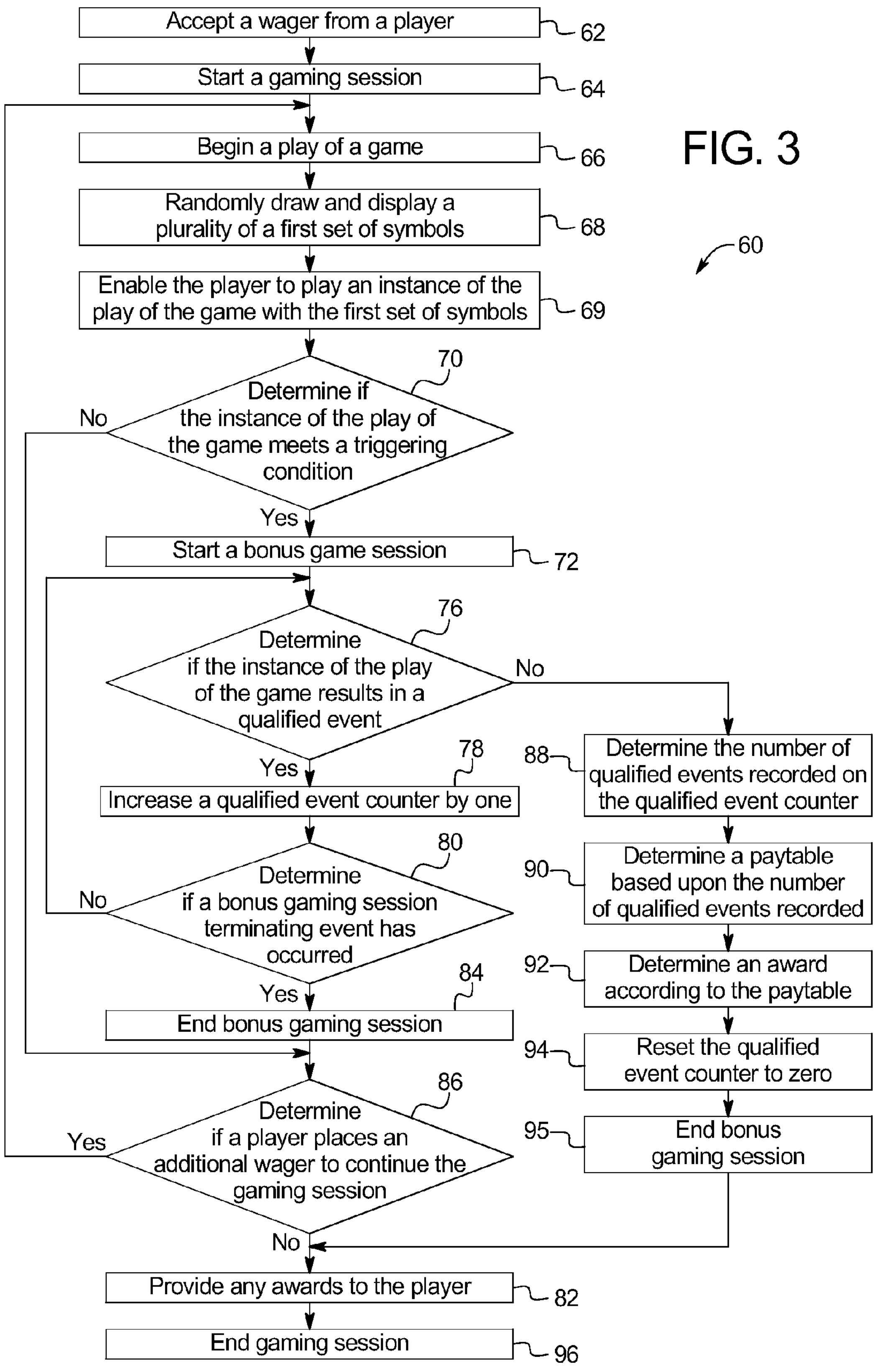
FIG. 3 is a flow chart of an example process for operating a gaming system with the bonus gaming session of one embodiment disclosed herein.
Figure 4:
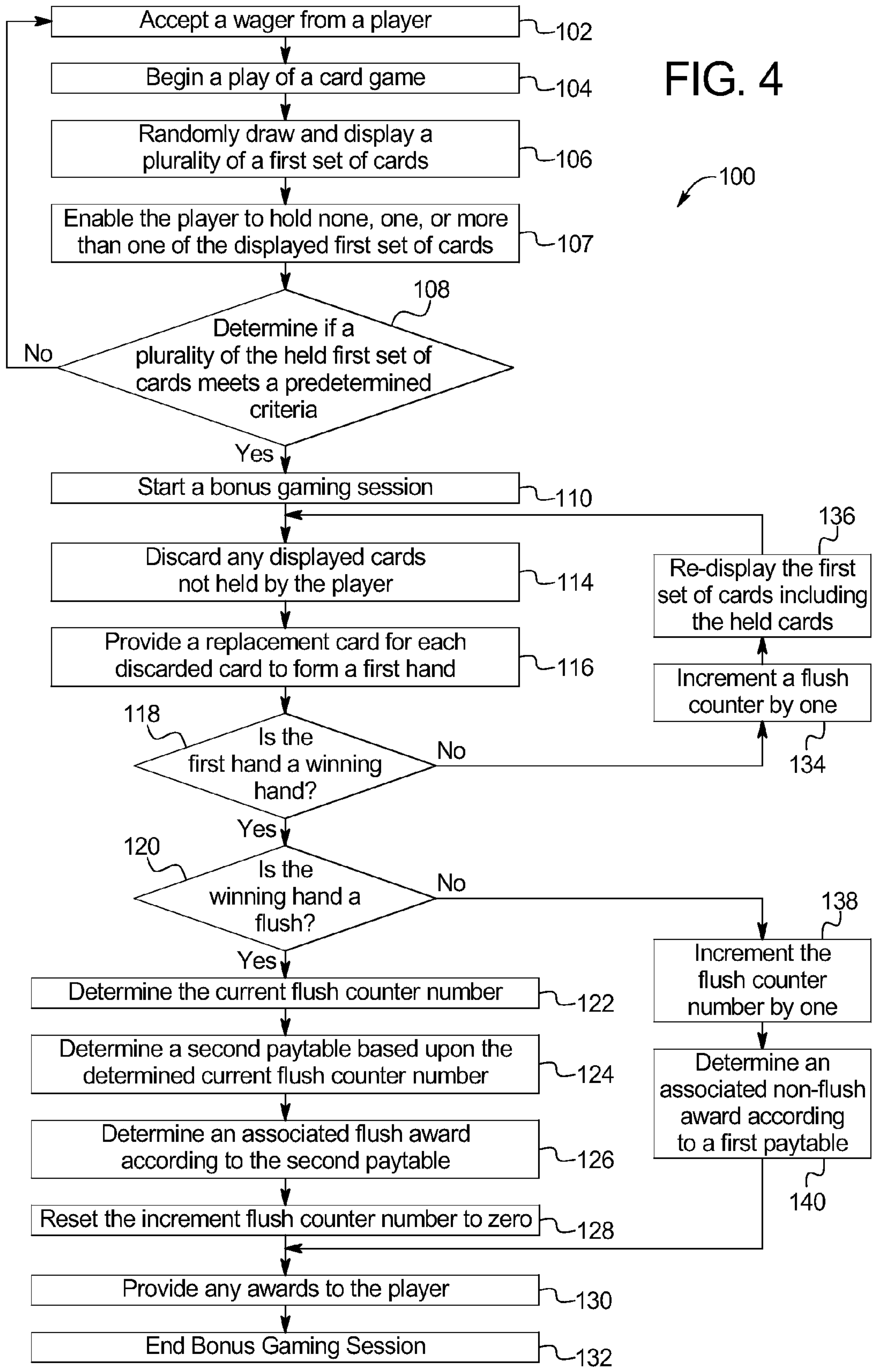
FIG. 4 is a flow chart of another example process for operating a gaming system with the bonus gaming session of one embodiment disclosed herein.

Referring now to FIGS. 5A to 5K, one specific example embodiment of the present disclosure is illustrated and described. FIG. 4 is also discussed contemporaneously with FIGS. 5A to 5K because the steps in the flow chart of FIG. 4 correspond to the specific example illustrated in FIGS. 5A to 5K. A more generic embodiment illustrated by the steps of the flow chart in FIG. 3 is then discussed. An alternative paytable is discussed in relation to FIG. 6.

Figure 5A:
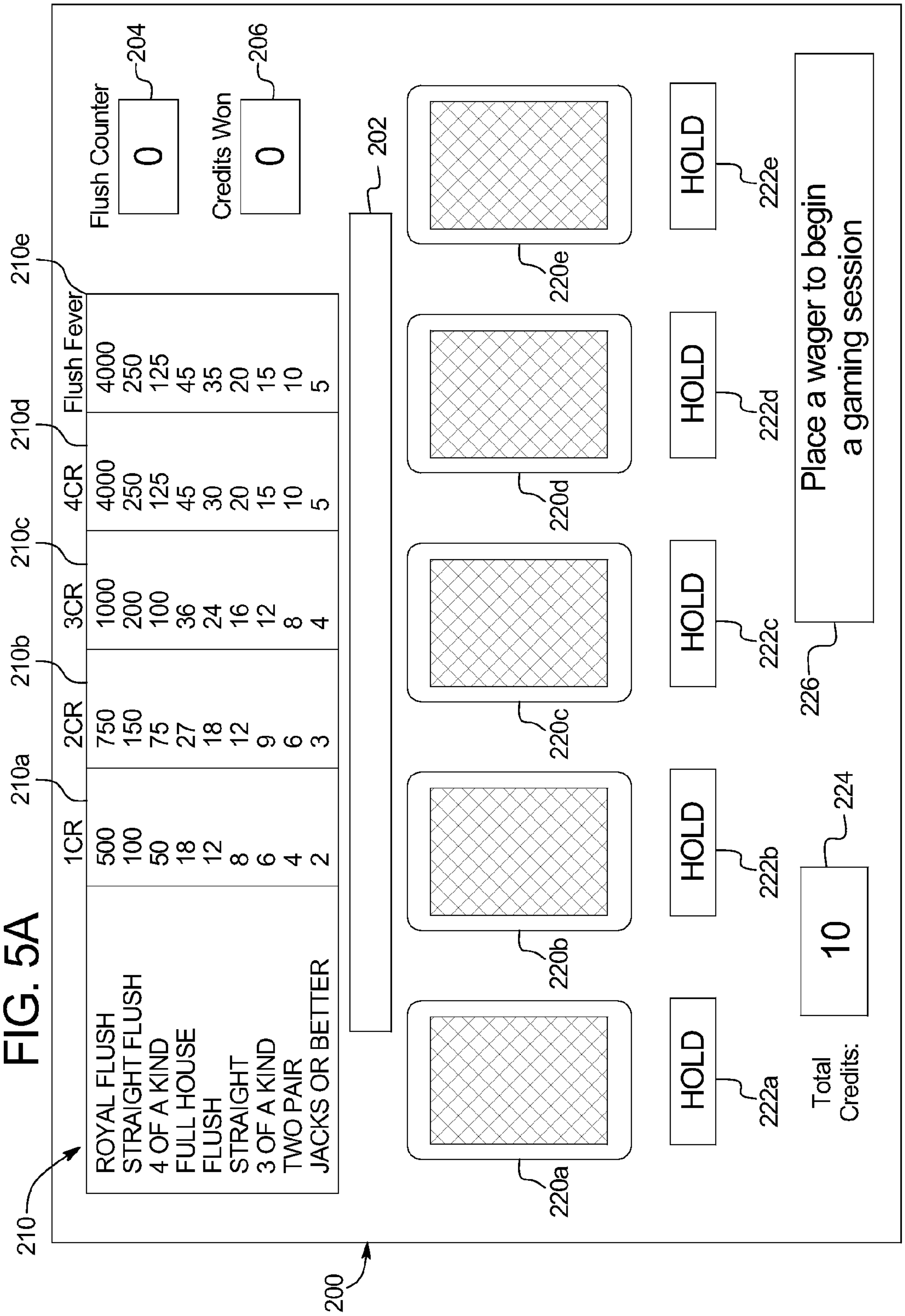
FIGS. 5A, 5B, 5C, 5D, 5E, 5F, 5G, 5H, 5I, 5J, and 5K each illustrate a point in time during one embodiment of a play of the game of the gaming system of one embodiment disclosed herein.

Referring to FIG. 5A, one exemplary embodiment of the display device of the gaming system of the present disclosure is illustrated before a gaming session begins. As illustrated in FIG. 5A, the gaming system includes a display device 200, which displays five card positions 220*a*, 220*b*, 220*c*, 220*d* and 220*e*, and HOLD buttons 222*a*, 222*b*, 222*c*, 222*d* and 222*e* associated with each of the card positions respectively. The display device 200 also includes a credit meter 224 to indicate to the player how many credits the player has, a CREDITS WON meter 206 to indicate how many credits a last winning play of the game has won, a flush counter 204, and message areas 202 and 226 that are configured to display instructions or other suitable messages to the player throughout the course of the gaming session.

A paytable portion 210 of the display device 200 includes several exemplary five card draw poker schedules 210*a*, 210*b*, 210*c*, 210*d* and 210*e* associated with traditional five card draw poker winning hands. The schedules 210*a*, 210*b*, 210*c* and 210*d* each indicate the credit payout associated with each respective winning hand, depending upon how many credits are wagered. For example, schedule 210*a* includes the awards provided for the several winning hands when one credit is wagered, 210*b* includes awards associated with two credits wagered, 210*c* includes awards associated with three credits wagered and 210*d* includes awards associated with four credits wagered. The Flush Fever schedule 210*e* initially includes similar awards as the other schedules 210*a* to 210*d* until the player enters a bonus gaming session, at which point Flush Fever schedule 210*e* dynamically adjusts according to several criteria described in further detail below.

Referring now to FIG. 4 and FIGS. 5A to 5K, one exemplary embodiment of the present disclosure is illustrated. As seen in FIG. 5A, message area 226 includes an invitation for the player to place a wager to start a play of a gaming session. The player deposits $10 as generally indicated by bock 102, and ten credits are displayed in the credit meter 224.

Figure 5B:
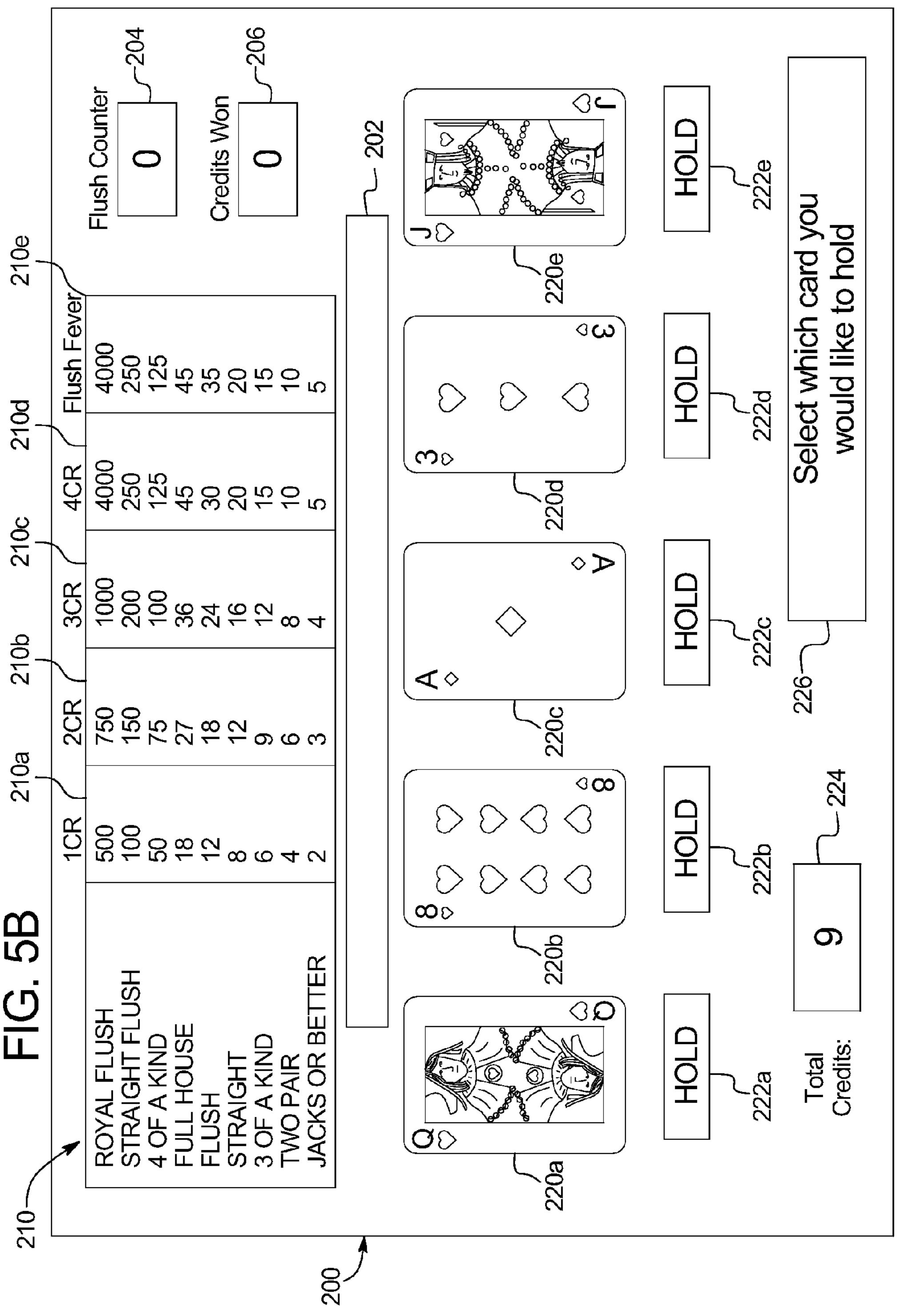

As illustrated in FIG. 5B, the player elects to wager one dollar or credit and the gaming system begins a play of a card game, as generally indicated by block 104. The credit meter 224 indicates that one credit has been deducted, and now indicates that nine credits remain. The gaming system randomly draws and displays five cards from a standard deck of playing cards to form a first set of cards, as indicated by block 106. The first set of cards are displayed in card positions 220*a* to 220*e*. The first set of cards includes Q♥ displayed in card position 220*a*, 8♥ displayed in card position 220*b*, A♦ displayed in card position 220*c*, 3♥ displayed in card position 220*d* and J♥ displayed in card position 220*e*. The gaming device enables the player to select none, one or more than one of the first set of cards to be held as indicated by block 107. Message area 226 displays an instruction to the player to select which, if any, of the first set of cards the player would like to hold. As indicated by diamond 108, the gaming system evaluates the held first set of cards to determine if a plurality of the held first set of cards meets a predetermined criteria. In this embodiment, the predetermined criteria is met if the held first set of cards is "drawn to a flush", which means that the first set of cards selected to be held by the player includes four or more cards of the same suit. The player has elected to hold cards Q♥, 8♥, 3♥, and J♥, which each share the heart suit, and therefore the first play of the game has met the predetermined criteria.

Figure 5C:
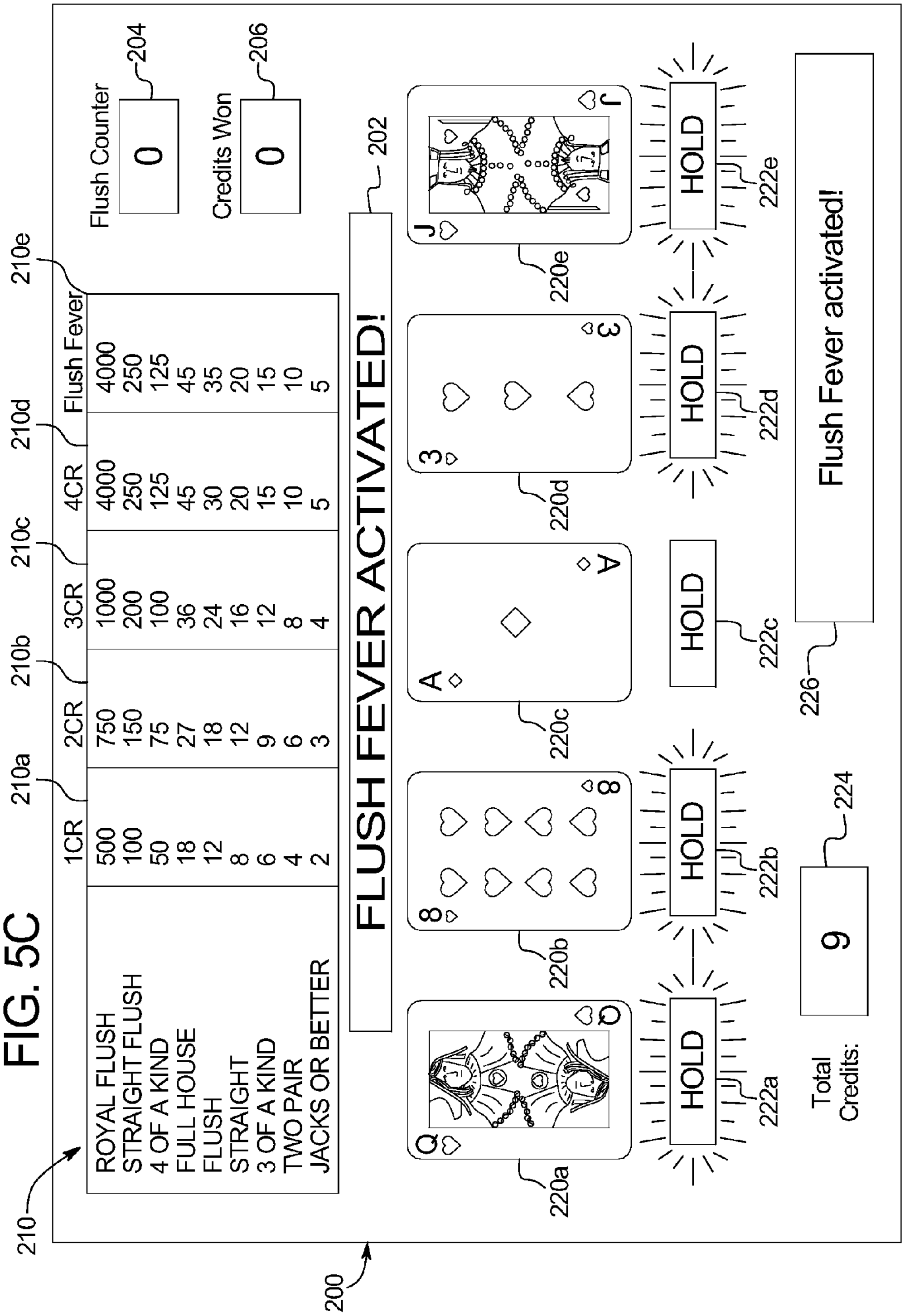

As illustrated in area 202 of FIG. 5C, the gaming system activates the Flush Fever bonus gaming session because the predetermined criteria of four cards drawn to a flush has been met, as also indicated by block 110. The message area 202 informs the player that Flush Fever mode has been activated. By holding the Q♥, 8♥, 3♥ and J♥, the player has elected to discard the A♦ and go for a flush, as indicated by the illuminated HOLD button 222*a* associated with the Q♥, the illuminated HOLD button 222*b* associated with the 8♥, the illuminated HOLD button 222*d* associated with the 3♥ and the illuminated HOLD button 222*e* associated with the J♥.

Figure 5D:
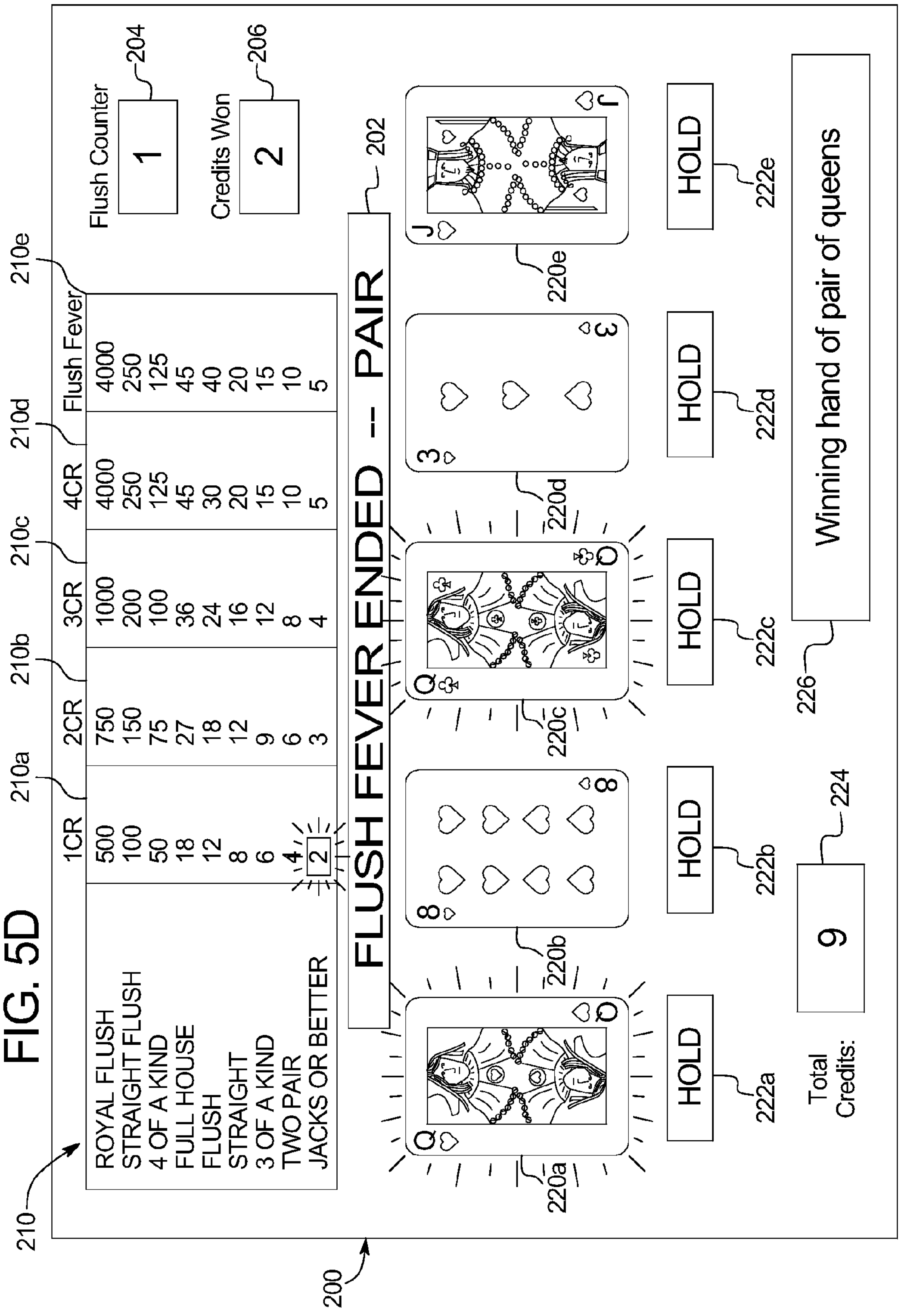

In FIG. 5D, the A♦ from card position 220*c* has been discarded as indicated by block 114. The gaming system replaces the discarded card from card position 220*c* with a randomly drawn new card, as indicated in block 116. The newly drawn Q♣ is displayed in card position 220*c* and combines with the previously held cards Q♥, 8♥, 3♥, and J♥ to form a final first hand. The gaming system evaluates whether the final first hand is a winning hand of a winning rank according to paytable 210. The gaming system determines that the pair of queens in the final first hand qualifies as a winning hand of "JACKS OR BETTER" according to the paytable 210, as decided in accordance with diamond 118. The gaming system evaluates the winning final first hand to determine if it has a flush ranking, as indicated by diamond 120. The winning final first hand is not a flush, and therefore the gaming device increments the flush counter 204 by one, as generally indicated by block 138.

The gaming system displays a message to the player stating that the pair of queens makes the first final hand a winning hand in message area 226 and the queens associated with the winning combination of cards in the first final hand are illuminated by the gaming system, as seen in card positions 220*a* and 220*c*. The gaming device determines an award associated with the winning final first hand as indicated by block 140. The player wagered one credit on this play of the game, so the gaming system determines that the award based upon schedule 210*a* of paytable 210, which corresponds to awards for games in which one credit is wagered. In this embodiment, the player wins two credits, which is displayed to the player in box 206: CREDITS WON. The award of two credits is provided to the player, and added to the total credits display 224 in FIG. 5E, as generally indicated by block 130. The gaming system ends the Flush Fever bonus gaming session as generally indicated by block 132 and displayed to the player in message area 202.

It should be appreciated that in various embodiments, the flush counter 204 starts the gaming session at an initial value. At this point in the gaming session, the flush counter 204 is at one, and as a result, the Flush Fever schedule 210*e* of paytable 210 has changed the award amount associated with a Flush winning outcome, as will be discussed in greater detail below. In this embodiment, the award of 35 credits for a flush at the beginning of the play of the game is adjusted to 40 credits as a result of the flush counter incrementing by one, as seen in FIG. 5E.

It should be appreciated that in one embodiment, the flush counts accumulate based upon number of qualified events in a bonus gaming session regardless of amounts wagered. In one such embodiment, however, the Flush Fever schedule 210*e* could be normalized, based upon the amount wagered on a hand which results in an award from the Flush Fever schedule. In another embodiment, the gaming system only increases the flush counts when the player places a certain extra wager or a maximum wager before the play of the game, in such an embodiment, the Flush Fever schedule need not be normalized because the required wager to qualify for a bonus gaming session is normalized.

Figure 5E:
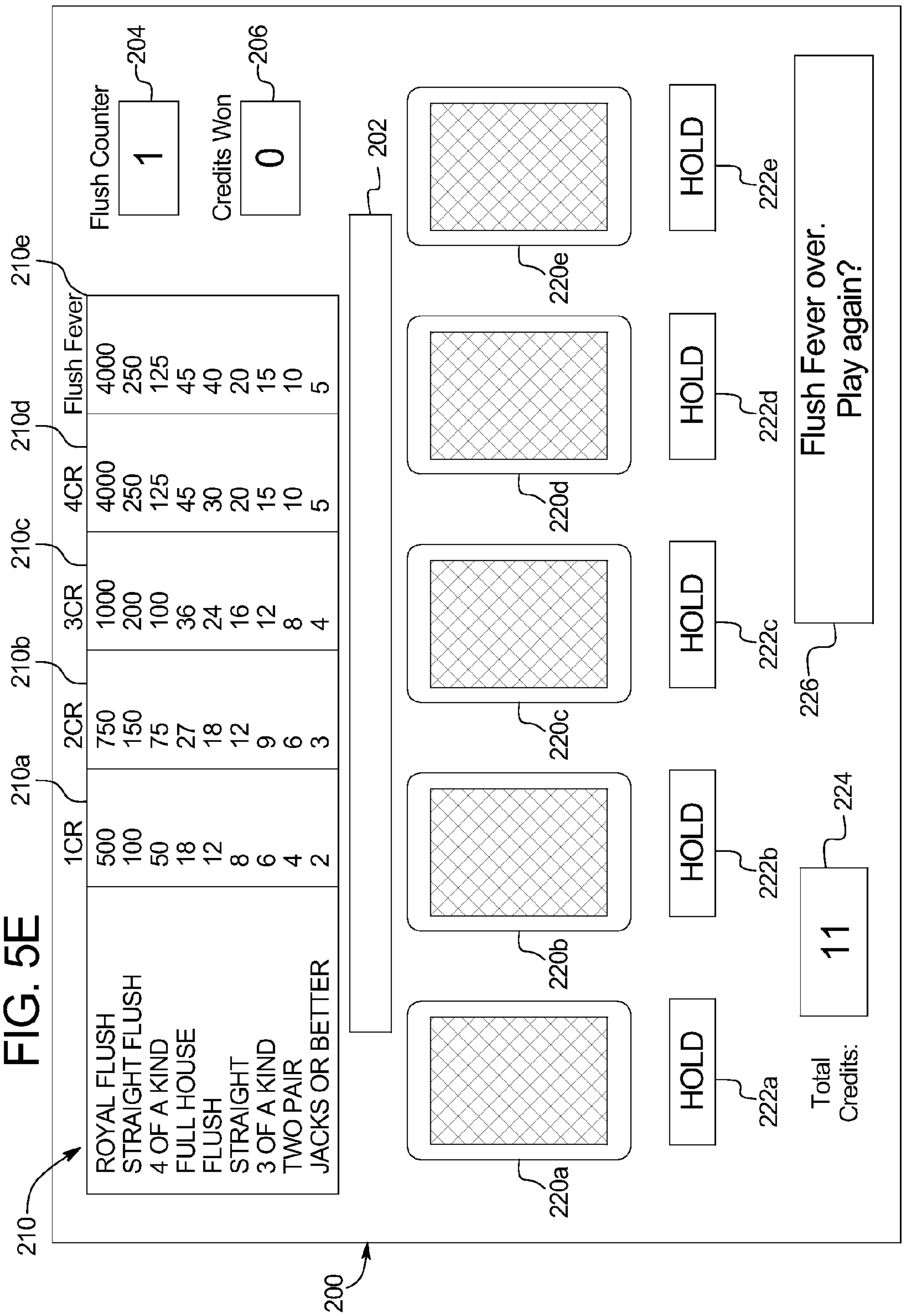

In FIG. 5E, the gaming system displays the updated total credits 224, including the two credits won from the first play of the game discussed above, and the total credits 224 now equal eleven. The gaming system invites the player to choose to play again, as displayed in message area 226. The player decides to play another play of the game and wager four credits, as generally indicated by block 102. Just as the one-credit wager of the first play of the game was associated with schedule 210*a*, the four-credit wager of this play of the game will be associated with schedule 210*d* of paytable 210.

Figure 5F:
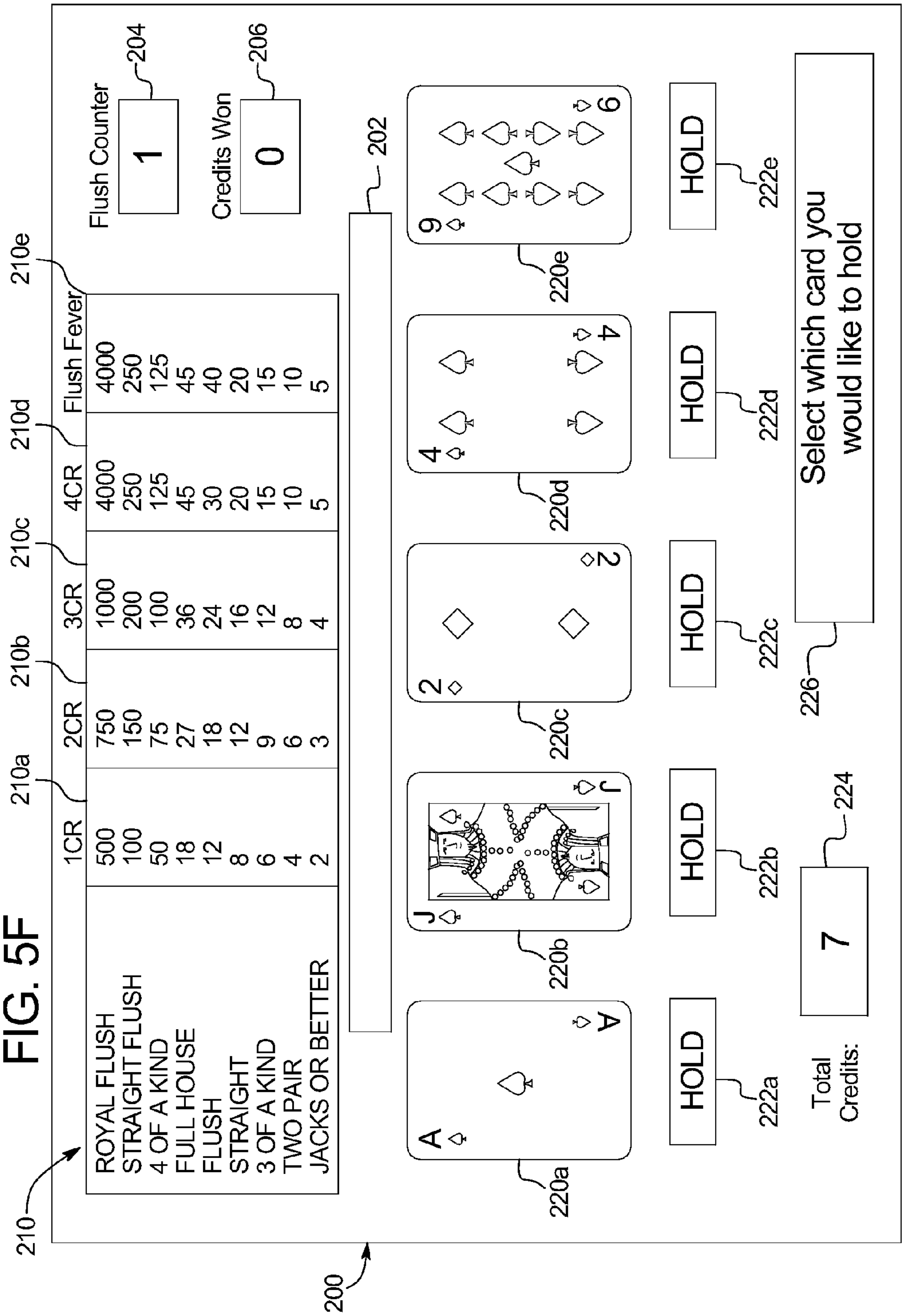

In FIG. 5F, the second play of the gaming session has begun, as indicated by block 104. The total credits 224 reflects the four-credit wager, and display 224 has been adjusted from eleven to seven. Five cards are randomly drawn and displayed to the player in card positions 220*a* to 220*e*, as indicated by block 106. The second set of cards are A♠, J♠, 2♦, 4♠ and 9♠, as displayed in card positions 220*a* to 220*e* respectively. The gaming system instructs the player to select which of the five cards in the second set of cards should be held, as shown in message area 226 and indicated in block 107. The player chooses to hold the A♠ by pressing HOLD button 222*a*, the J♠ by pressing HOLD button 222*b*, the 4♠ by pressing HOLD button 222*d* and the 9♠ by pressing HOLD button 222*e*.

Figure 5G:
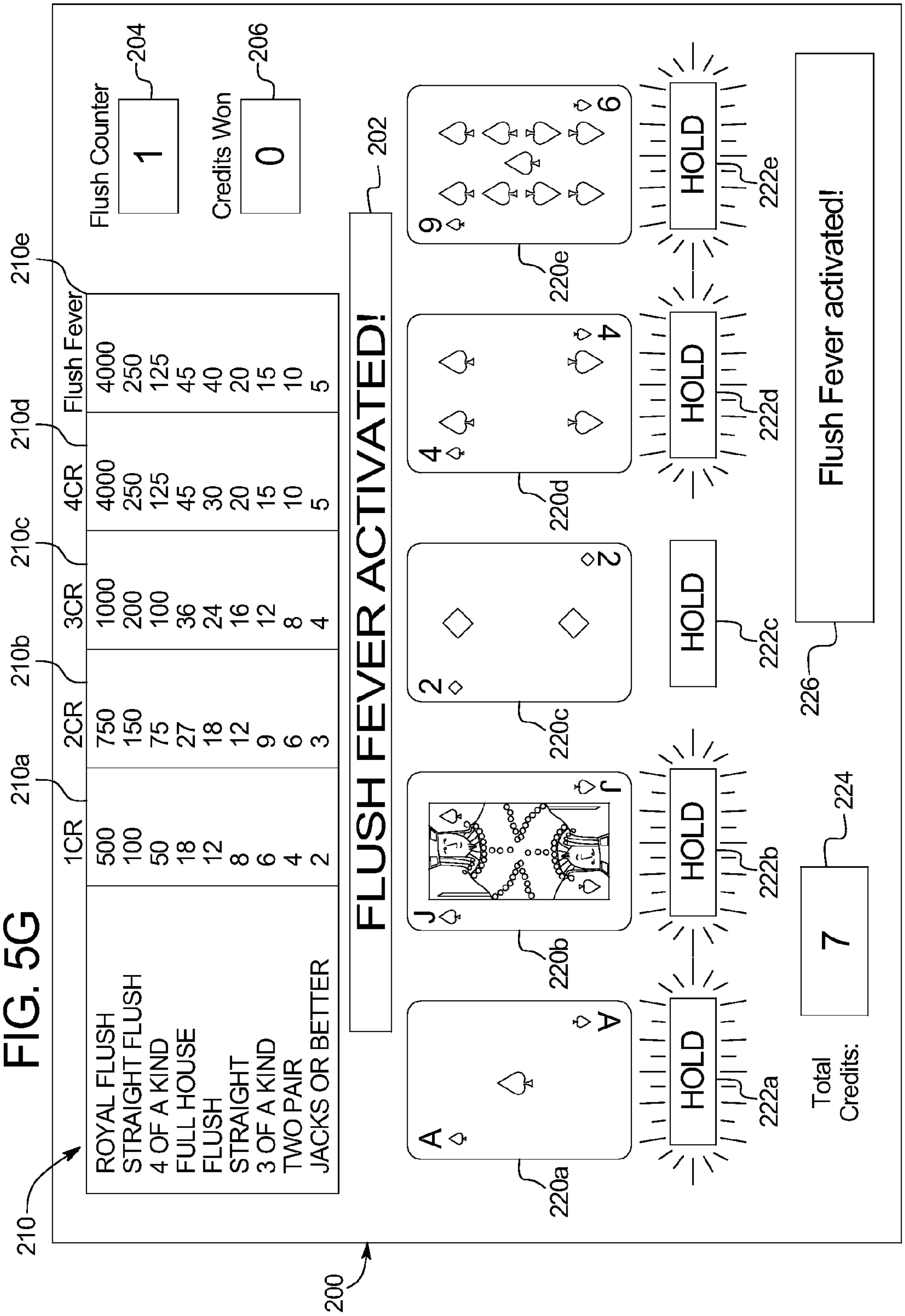

In FIG. 5G, the gaming system has analyzed the second set of cards and has determined that the second set of cards includes four cards of the same suit, and therefore the Flush Fever bonus gaming session should begin, as indicated by diamond 108 and block 110. The gaming system informs the player that the game has now entered Flush Fever mode, as shown in message areas 202 and 226.

Figure 5H:
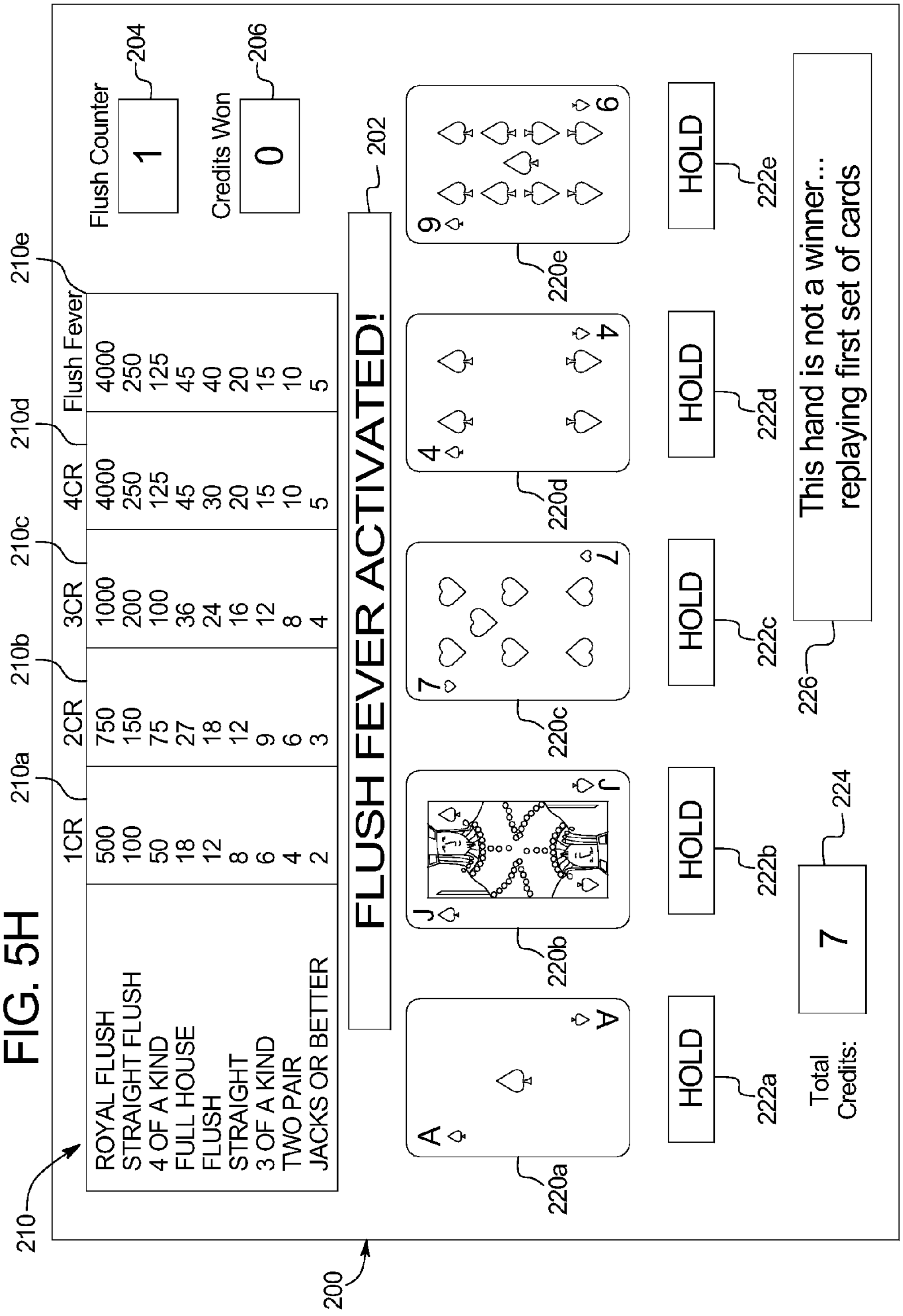

In FIG. 5H, the gaming system has discarded the card not selected to be held, 2♦ from card position 220*c*, as indicated by block 114. The gaming system then randomly draws and displays replacement card 7♥ in card position 220*c* to form a final second hand, as indicated by block 116. The gaming system evaluates the final second hand and determines that the hand is not a winning hand, as indicated by diamond 118. Message area 226 informs the player that the hand is not a winner.

Figure 5I:
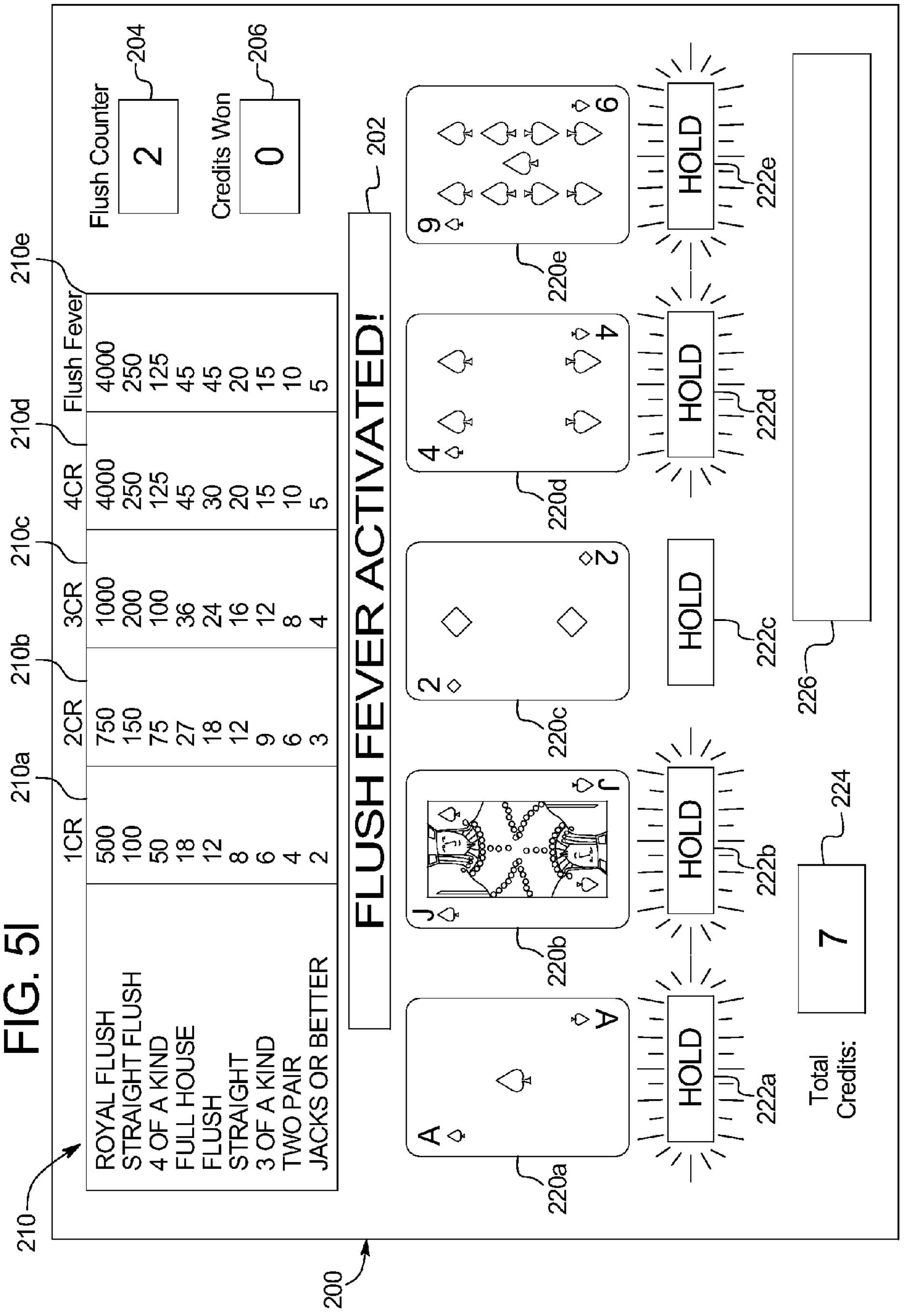

As shown in FIG. 5I, the flush counter 204 is incremented by one because the second final hand was a non-winning hand, as indicated by block 134. The flush counter 204 now reads two, and the award associated with a winning flush hand in the Flush Fever schedule 210*e* of paytable 210 increases from 40 credits to 45 credits accordingly. The gaming system re-displays the randomly drawn second set of cards, as indicated by block 136, and the original second set of cards from the beginning of the second play of the game A♠, J♠, 2♦, 4♠ and 9♠, is displayed in card positions 220*a* to 220*e* respectively. As shown in message area 202, Flush Fever mode is still activated, and the player will get another opportunity to re-draw a fifth card and get a final hand of a flush without paying any additional wager. As shown in FIG. 4, the gaming device returns to the start of the bonus gaming session. Like the initial play of the second set of cards, the player's hold selections of the A♠ in card position 220*a*, the J♠ in card position 220*b*, the 4♠ in card position 220*d* and the 9♠ in card position 220*e* remain, allowing the 2♦ from card position 220*c* to be discarded, as indicated by block 114. It should be appreciated that in one embodiment, the fifth card is redrawn automatically following a non-winning hand, and the 2♦ is never re-displayed. In one embodiment, the player need not hold or discard any cards in the Flush Fever bonus gaming session until a winning outcome is achieved form an automatically redrawn fifth card.

Figure 5J:
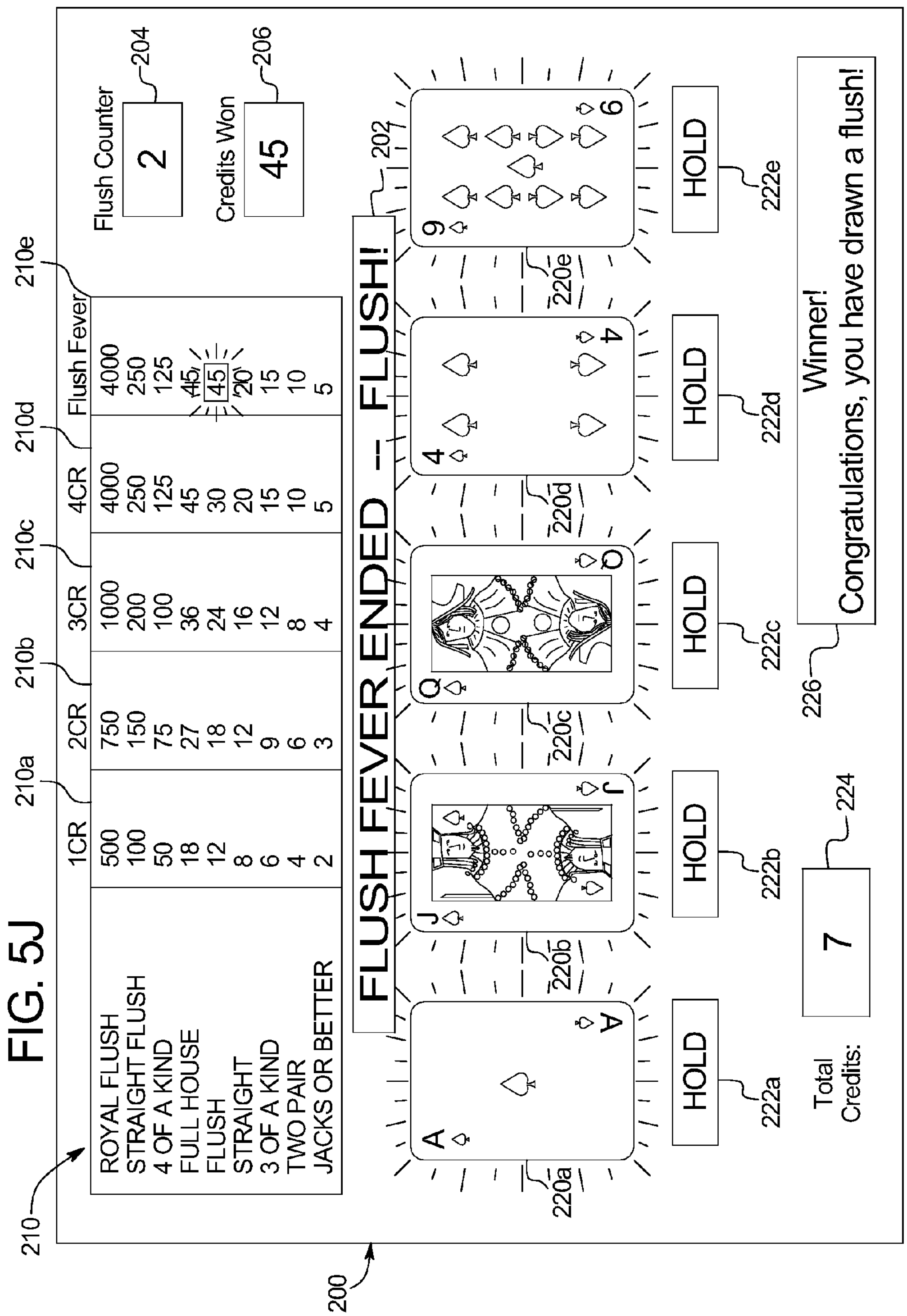

In FIG. 5J, the gaming system discards the 2♦ and replaces it with a randomly drawn replacement card as indicated by block 116. The replacement card displayed in card position 220*c* is a Q♠ forming a final hand of A♠, J♠, Q♠, 4♠ and 9♠. The gaming system evaluates the final hand, as indicated by diamond 118, and determines that it qualifies as a winning hand according to paytable 210. The gaming system then evaluates the winning hand and determines that the winning hand has a flush ranking, as decided in accordance with diamond 120. Card positions 220*a* to 220*e* are each illuminated to the player because each card is associated with the winning hand of flush. Message area 226 congratulates the player on being a winner and achieving a winning hand with a flush ranking.

Because the winning hand has a flush ranking, the gaming system determines the current flush counter number of two, as indicated by block 122. Based upon the flush counter number of two, the Flush Fever schedule 210*e* of paytable 210 is adjusted, as indicated by block 124. The gaming system references the adjusted Flush Fever schedule 210*e* and determines that the award associated with the winning flush hand is 45 credits. The Flush Fever mode is ended, as indicated by message area 202 and block 132.

Figure 5K:
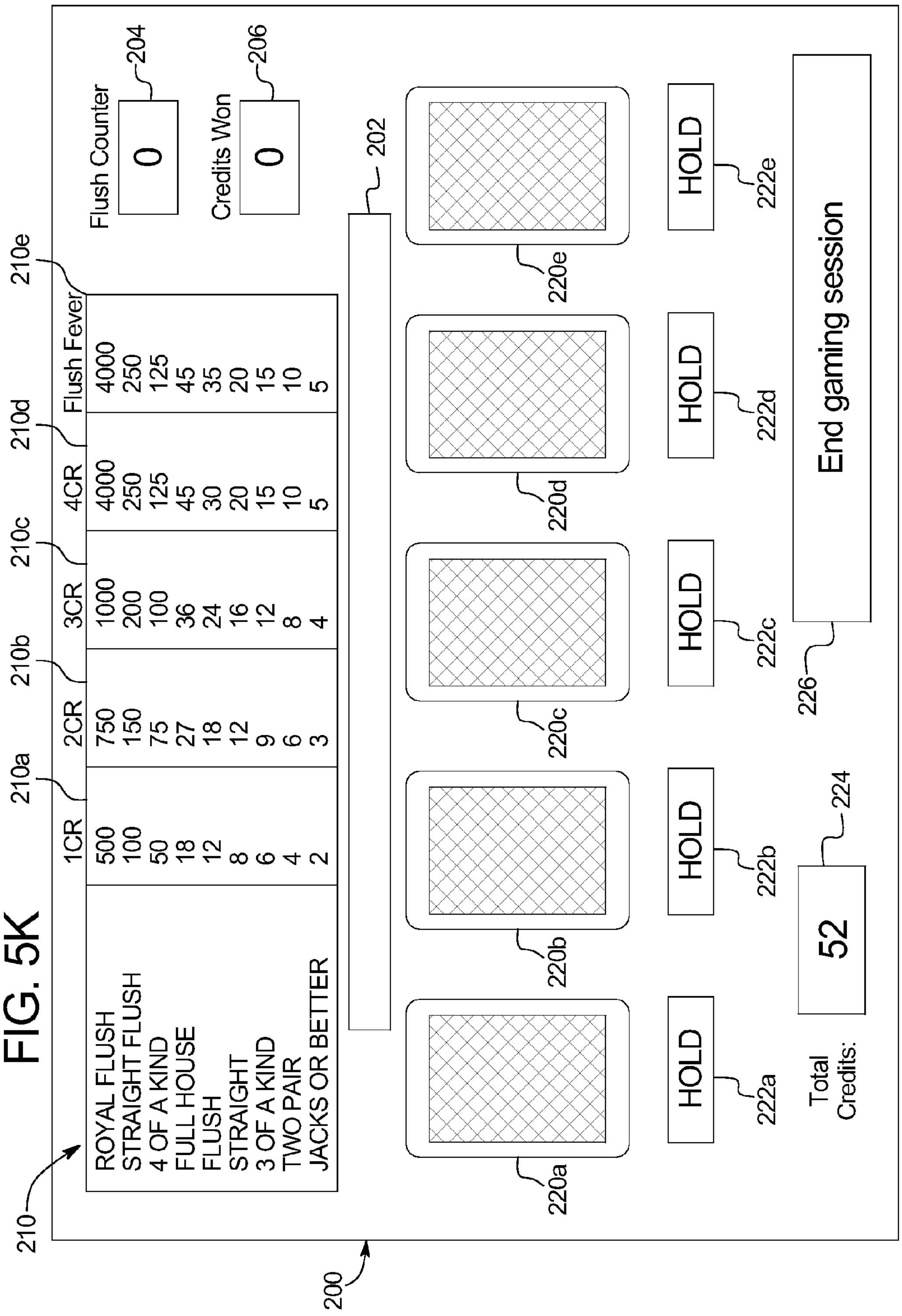

In FIG. 5K, the flush increment counter 204 is reset to an initial value, as indicated by block 128, and the gaming device provides the 45 credit award to the player, as indicated by block 130 adjusting the total credits 224 from seven to 52. The gaming session is now over, as indicated by message area 226, and the player can start a new gaming session or cash out his winnings.

Referring now back to FIG. 3, a more generic embodiment of the gaming system of the present disclosure is illustrated and generally indicated by block 60. The gaming system or gaming device is configured to accept a wager from a player as indicated by block 62 to start a gaming session as indicated by block 64. The player begins a play of the game as indicated by block 66 in the gaming session. During the play of the game, the gaming system is configured to randomly draw and display a plurality of a first set of symbols, as indicated by block 68. In one embodiment, as illustrated and discussed above, the game is a draw poker game. In an alternative embodiment, the game is a symbol game or a reel slot game. In one such example embodiment, one or more reels are re-spun to generate additional symbols to try to reach the designated winning event.

After the start of the play of the game, the gaming system enables the player to play an instance of the play of the game with the first set of symbols, as indicated by block 69. The gaming system evaluates the instance of the play of the game to determine if a plurality of the first set of symbols meets a triggering condition as indicated by diamond 70. In one embodiment, the triggering condition is the presence of a common feature between a plurality of the symbols, such as a plurality of playing cards having a common suit. In an alternative embodiment, the triggering condition is matching symbols between a plurality of the displayed set of symbols. In one embodiment, the instance of the play of the game includes playing a traditional draw poker game using the first set of symbols. In one such embodiment, the gaming session invites the player to hold a plurality of the first set of symbols and discard any non-held symbols. The discarded symbols are replaced with randomly drawn replacement symbols to form a first hand in the instance of the play of the game.

If the gaming system determines an instance of the play of the game meets a triggering condition, the play of the game enters a bonus gaming session as indicated by block 72. In various embodiments, the first set of symbols includes three or more total symbols, and instance of the play of the game meets the triggering condition if a majority of the first set of symbols are in common with one another. For example, if the first set of symbols includes seven symbols, the instance of the play of the game meets a triggering condition if five of the seven symbols are in common with one another. It should be appreciated that the plurality required to meet the triggering condition can vary based upon odds and percentages associated with the game played in the gaming session. In the embodiment illustrated in FIGS. 5A to 5K and discussed above, the instance of the play of the game meets a triggering condition if at least four of the five dealt cards share a common suit.

It should be appreciated that, in one embodiment, the triggering condition is not met unless a plurality of the symbols in the instance possess a similar feature or suit and the player chooses to hold at least a plurality of the symbols with the similar feature. For example, in one draw poker embodiment, suppose the gaming system's initial deal includes A♥, J♥, Q♣, 10♥, and 5♥, displayed to the player. In this case, the player can elect to either discard the Q♣ and attempt to get a hearts-flush, or discard the 5♥ and attempt to draw a king to get a straight. The first prong of the triggering condition is met because four of the five cards share a suit: hearts. However, the second prong of the triggering condition in this embodiment requires the player to also elect to hold the four hearts. If the player elects to discard the 5♥ to try and get a 10, J, Q, K, A straight, the second prong of the triggering condition is not met, and the player will not enter the bonus gaming session. If however, the player holds the four hearts, both prongs of the triggering condition are met, and the game enters the bonus gaming session.

It should also be appreciated that, if the player draws five cards of the same suit in the first set of symbols, the player can elect to hold only four of the cards, and the triggering condition is still met. In one such exemplary embodiment, suppose the gaming system's initial deal includes A♥, J♥, Q♥, 10♥, and 5♥, and the player decides that the player would like to try and get a royal flush. The player can hold all but the 5♥, and the triggering condition will be met, thereby entering the game into the bonus gaming session. It should be appreciated that, in one embodiment, if the player elects to hold all five hearts, the gaming system will not enter the bonus gaming session, and the triggering condition is not met.

If the gaming system determines that an instance of the play of the game fails to meet a triggering condition, the play continues as a normal play of the game and the player is not eligible to enter the bonus gaming session until placing an additional wager and playing a new play of the game in which the triggering condition is met. In such a case, the player is invited to choose whether to place an additional wager, as indicated by diamond 86. If the player chooses not to place an additional wager, the gaming session ends, as indicated by block 96. If the player chooses to place an additional wager to continue the gaming session, a new play of the game begins, as indicated by block 66.

It should be appreciated that, unless the triggering condition is met, FIG. 3 does not include the steps of evaluating the final hand to determine if it is a winning outcome. In the illustrated embodiments discussed herein, the triggering condition only determines whether or not a gaming session enters a bonus gaming session, as discussed in detail below. Simply because the triggering condition is not met does not necessarily mean that the play of the game or the instance of the play of the game is over or that the outcome of the play of the game is a non-winning result; rather, only for purposes of the bonus gaming session is the play of the game over.

When the gaming system determines at diamond 70 that a triggering condition has been met by the first set of symbols, the game enters a bonus gaming session, as indicated by block 72. When the game enters the bonus gaming session, the gaming system evaluates the instance of the play of the game to determine if it results in a qualified event, as indicated by diamond 76. In one embodiment, the gaming system evaluates the instance by comparing the symbols to an associated paytable to determine if the instance results in a qualified event. In one draw poker embodiment, the qualified events include: any non-flush winning hand according to a traditional draw poker paytable, and any non-winning hand according to a traditional draw poker paytable.

If the instance of the play of the game results in a qualified event (i.e., a non-flush first hand or a non-winning first hand, in one embodiment), a qualified event counter associated with the gaming session is increased by one, as indicated by block 78. In one embodiment, the gaming system includes two different types of qualified events: a winning qualified event and a non-winning qualified event. In one such draw poker embodiment, the winning qualified event is a draw poker hand that results in a winning outcome according to a draw poker paytable, but is not a flush. The non-winning qualified event is an outcome in the bonus gaming session that does not correspond to any winning outcome according to a draw poker paytable. In one such embodiment, the gaming system includes two flush counters: one flush counter associated with a winning qualified event and one flush counter associated with a non-winning qualified event. Each flush counter starts a gaming session having an initial value. In such an embodiment, only the winning qualified event counter is incremented by one for any winning qualified event, and the non-winning qualified event counter is not incremented. For example, if a draw poker hand in the bonus gaming session results in a pair of queens (i.e., a winning qualified event), only the winning qualified event counter is increment by one. However, if the draw poker hand in the bonus gaming session results in a random assortment of cards that does not correspond with a winning draw poker hand, both the winning qualified event counter and the non-winning qualified event counter are incremented by one.

As discussed in further detail below, the counters are used to adjust a paytable for determining awards when a non-qualified event occurs within a bonus gaming session. In an embodiment including a winning qualified event counter and a non-winning qualified event counter, the different event counters affect different specific awards when the paytable is adjusted for a non-qualified event within a bonus gaming session. In one embodiment, the non-winning qualified event counter is taken into account when adjusting the royal flush and straight flush awards with an associated bonus gaming session paytable, and the winning qualified event counter is used to adjust the flush awards with the associated bonus gaming session paytable. For example, each time a winning qualified event counter increments, only the flush award is affected when the paytable is adjusted for a non-qualified event, and each time a non-winning qualified event counter increments, only the straight flush and royal flush awards are affected when the paytable is adjusted for a non-qualified event.

It should also be appreciated that in various embodiments, the non-winning qualified event counter is a quasi-progressive meter, which continues to accumulate until either a royal flush or a straight flush is achieved. In one such embodiment, the non-winning qualified event counter does not reset on account of the gaming session ending, as does the winning qualified event counter; only the display of a straight flush or royal flush within the bonus gaming session results in the reset of the non-winning qualified event counter.

As seen in FIG. 6, an example paytable for a quasi-progressive embodiment is displayed. In the paytable of FIG. 6, the types of winning hands are listed under column A. The payout amounts corresponding to each of the winning hands are listed in columns B to F, depending upon how many credits are wagered: column B for one credit wagered; column C for two credits wagered; column D for three credits wagered; column E for four credits wagered and column F for five credits wagered. The payout amounts for hands while the bonus gaming session is in the Flush Fever are listed under column G. In this example, each time the player draws a card that does not make a winning combination, while in the bonus gaming session (i.e., a non-winning qualified event), both the royal flush and the straight flush pays increment by a credit. In one embodiment, the non-winning qualified event counter increments until it is hit, whether or not the bonus gaming session or the gaming session ends. In the paytable of FIG. 6, the Royal Flush award has accumulated to 4,122 credits, and the straight flush award has accumulated to 281 credits. It should be appreciated that in various embodiments, the gaming system is configured to keep a separate quasi-progressive flush counter for Royal Flush and for Straight Flush.

Referring now back to FIG. 3, the gaming system determines whether or not a bonus gaming session terminating event has occurred, as indicated by diamond 80. In one embodiment, a bonus gaming session terminating event occurs if the instance resulting in the qualified event is a winning hand according to a traditional draw poker paytable. If a terminating event has occurred, the gaming system provides any awards associated with any instances of any plays of the game as indicated by block 82, and the bonus gaming session ends as indicated by block 84. In the event that a terminating event has occurred, the gaming system enables the player to place an additional wager to continue the gaming session, as indicated by diamond 86. If the player places an additional wager, the gaming system begins a new play of the game, as indicated by block 66. It should be appreciated that, even if the bonus gaming session ends due to a terminating event, the player can continue to play the gaming session keeping all accumulated counts on the qualified event counter for any future bonus gaming sessions. When the player decides not to place an additional wager to continue the gaming session, the gaming system provides any awards to the player, as indicated by block 82, and the gaming session ends, as indicated by block 96.

If a terminating event has not occurred, the bonus gaming session continues, and the player is able to play another instance of the play of the game with the first set of cards, as indicated by block 74. In one embodiment, the second instance of the play of the game starts by displaying and enabling the player to play with the same first set of symbols. In an alternative embodiment, the second instance includes some but not all of the first set of symbols. For example, in one exemplary embodiment, if the first set of symbols includes four playing cards of one suit and a fifth playing card of a different suit, the second instance of the play of the game includes the four similarly suited cards from the first set of cards, but not the fifth card. In one such embodiment, the fifth card of the first set of cards that is played in the first instance is discarded for the play of the second instance, thereby reducing the number of available replacement cards from which to draw in the second instance. It should be appreciated that, in various embodiments, the replacement card dealt in the first instance of the play of the game is also removed for the play of the second instance, which reduces the number of available replacement cards from which to draw in the second instance.

The bonus gaming session continues and repeats instances using at least a plurality of the first set of symbols until either: (i) the instance of the play of the game does not result in a qualified event, or (ii) a bonus gaming session terminating event occurs. Each time the bonus gaming session repeats and a qualified event occurs, the qualified event counter increments by one. In one embodiment, each time the bonus gaming session repeats an additional instance, due to a final hand not qualifying as a winning hand, both the discarded card and the replacement card are removed from the cards available to be drawn in the following instance. It should be appreciated that, as the bonus gaming session continues and repeats, and cards associated with non-winning hands are removed, the probability of a player continuing to receive a non-winning hand decreases. Due to the decreasing probability of receiving a non-winning hand for each consecutive instance of the play of the game, awards associated with receiving a non-qualified event increase corresponding to the increased qualified event counter.

When an instance of the play of the game does not result in a qualified event as determined in diamond 76, the gaming system follows a separate branch of the diagram of FIG. 3, beginning with block 88. In one draw poker embodiment, a non-qualified event occurs when the instance of the play of the game results in a winning hand with a flush ranking. In a symbol embodiment, a non-qualified event occurs when the instance of the play of the game results in a winning hand of all matching symbols.

As indicated by block 88, the gaming system determines the number of qualified events recorded on the qualified event counter associated with the gaming session. If should be appreciated that the qualified event counter continues to accumulate through all bonus gaming sessions entered in the gaming session. Based upon the number of qualified events recorded on the qualified event counter, the gaming system determines a paytable, as indicated by block 90. In one embodiment, the paytable includes awards for each winning combination for that particular game, and a selection of the winning combinations are adjusted based upon the number on the qualified event counter. For example, in a draw poker embodiment, the paytable includes awards for Royal Flush, Straight Flush, 4 of a Kind, Full House, Flush, Straight, 3 of a Kind, Two Pair, and Jacks or Better. The award amounts for all of the winning combinations with the exception of the Flush remains consistent with a traditional draw poker paytable. In other embodiments with multiple qualified event counters, the royal flush and/or straight flush awards also adjust according to corresponding qualified event counters, as discussed above.

In one embodiment, the award associated with a Flush winning combination varies based upon the qualified event counter. It should be appreciated that the variance between a traditional award for a selection of adjusted winning combinations and the adjusted award for the selection of adjusted winning combinations can be linear or nonlinear. In one linear variance embodiment, the award for a flush increases by a static amount for each qualified event count above an initial value. For example, as shown in the embodiment described above and illustrated in FIGS. 5A to 5K, the FLUSH award starts at 35 credits, and for each additional qualified event count, the Flush award increases by five credits. In one nonlinear variance embodiment, the award for a flush increases by a progressively smaller marginal amount for each additional qualified event count incremented on the meter. For example, the FLUSH award starts at 35 credits, increases by five credits to 40 credits after one qualified event, increases by four credits after five qualified events, increases by three credits after ten qualified events, etc. It should be appreciated that a nonlinear variance embodiment could also result in marginally increasing awards as the qualified event counter goes up.

After determining the paytable based upon the qualified event counter, the gaming system determines an award according to the paytable, as indicated by block 92. The gaming system resets the qualified event counter associated with the gaming session is to an initial value, as indicated by block 94, and the bonus gaming session ends, as indicated by block 95. After the bonus gaming session is over, the gaming system provides any awards to the player, as indicated by block 82, and the gaming session ends, as indicated by block 96.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

We claim:

1. A gaming system comprising:

at least one input device;

at least one display device;

at least one processor; and at least one memory device which stores a plurality of instructions, which when executed by the at least one processor for a gaming session, cause the at least one processor to operate with the at least one input device and the at least one display device to:

(a) receive a wager from a player to start a play of a card game;

(b) randomly select a plurality of cards to form a first set of cards;

(c) display the formed first set of cards to the player;

(d) enable the player to select none, one, or more than one card from the first set of cards;

(e) hold said selected cards from the first set of cards;

(f) discard each card not selected to be held from the first set of cards;

(g) provide a replacement card to each discarded card from the first set of cards;

(h) form a first hand of cards with the held cards from the first set of cards and any replacement cards provided to the first set of cards; and (i) evaluate the first hand of cards to determine if a predetermined criteria is satisfied;

(j) if the predetermined criteria is not satisfied, provide the player any awards associated with the first hand of cards;

(k) if the predetermined criteria is satisfied, start a bonus gaming session; and (l) in the bonus gaming session:

(1) evaluate the first hand to determine whether:
- (i) the first hand qualifies as a first winning hand;
- (ii) the first winning hand has a non-flush ranking; and
- (iii) the first winning hand has a flush ranking (2) if the first hand is not a winning hand:
- (i) increment a flush counter by one;
- (ii) re-display the held cards from the first set of cards;
- (iii) replace each card not held from the first set of cards with a randomly drawn card to form a modified first hand with the held cards from the first set of cards; and
- (iv) determine if the modified first hand qualifies as the first winning hand;

(3) if the first winning hand has said non-flush ranking:
- (i) increment the flush counter by one;
- (ii) determine any non-flush award according to a first paytable;
- (iii) provide the non-flush award to the player; and
- (iv) end the bonus gaming session; and (4) if the first winning hand has said flush ranking:
- (i) determine a current flush counter number;
- (ii) based on the current flush counter number, determine a second paytable, wherein said second paytable includes increasingly higher relative corresponding awards than said first paytable for each flush counter number greater than zero;
- (iii) determine a flush award associated with the second paytable;
- (iv) provide the flush award to the player;
- (v) end the bonus gaming session; and
- (vi) end the gaming session.

2. The gaming system of claim 1, wherein the predetermined criteria is satisfied if a predetermined number of the first set of cards has a qualifying condition.

3. The gaming system of claim 2, wherein the predetermined number of the first set of cards is four.

4. The gaming system of claim 2, wherein the qualifying condition is a plurality of cards that share a common suit.

5. The gaming system of claim 4, wherein the common suit is one of hearts, diamonds, clubs, and spades.

6. The gaming system of claim 2, wherein the first set of cards meets the predetermined criteria if: (1) said predetermined number of the first set of cards each share a common suit; and (2) the player selects at least each of the first set of cards that share a common suit to be held from the first set of cards.

7. The gaming system of claim 1, wherein the bonus gaming session repeats the play of the first set of cards until the first hand is said first winning hand.

8. The gaming system of claim 7, wherein the flush counter increments by one for each non-winning hand in the bonus gaming session.

9. The gaming system of claim 1, which includes causing the at least one processor to execute the plurality of instructions to automatically replace each card not held from the first set of cards to determine the modified first hand.

10. The gaming device of claim 9, which includes causing the at least one processor to execute the plurality of instructions to:

if the modified first hand does not qualify as said modified first winning hand, automatically replace said each card not held from the first set of cards to form a second modified first hand until any of said modified first hands qualify as said winning hand.

11. A gaming system comprising:

at least one input device;

at least one display device;

at least one processor; and at least one memory device which stores a plurality of instructions, which when executed by the at least one processor, cause the at least one processor to operate with the at least one input device and the at least one display device to:

(a) receive a wager from a player to start a gaming session;

(b) begin a play of a game in the gaming session;

(c) randomly draw and display a plurality of a first set of symbols in the play of the game;

(d) enable a player to play an instance of the play of the game with the first set of symbols;

(e) determine if a predetermined criteria has been satisfied by the instance of the play of the game;

(i) if the predetermined criteria has not been satisfied by the instance of the play of the game, determine any awards associated with the instance of the play of the game to provide to the player; and (ii) if the predetermined criteria has been satisfied by the instance of the play of the game, determine if a qualified event has occurred:

(A) if the qualified event has occurred:

(I) increase a qualified event counter by one;

(II) determine if a terminating event has occurred;

(III) if the terminating event has not occurred, enable the player to play another instance of the first set of symbols; and (IV) if the terminating event has occurred, end the play of the game; and (B) if the qualified event has not occurred:

(I) determine the number of qualified events stored on the qualified event counter;

(II) determine a paytable based upon the number of qualified events stored; and (III) determine an award according to the paytable; and (f) provide any awards to the player.

12. The gaming system of claim 11, wherein the first set of symbols includes five playing cards.

13. The gaming system of claim 12, wherein the instance of the play of the game includes:

(1) enabling the player to select none, one or more than one of the five playing cards in the first set of symbols to be held;

(2) discarding any of the five playing cards not selected to be held;

(3) replacing each discarded card with a randomly drawn replacement card; and (4) forming a first hand of cards including each of the five playing cards selected to be held and any replacement cards.

14. The gaming system of claim 13, which includes causing the at least one processor to execute the plurality of instructions to:

evaluate the first set of symbols to determine if the predetermined criteria has been satisfied.

15. The gaming system of claim 13, which includes causing the at least one processor to execute the plurality of instructions to:

evaluate the first hand of cards to determine if the predetermined criteria has been satisfied.

16. The gaming system of claim 14, wherein the first set of symbols meets the predetermined criteria if at least four of the playing cards in the first set of symbols share a common suit.

17. The gaming system of claim 15, wherein the first hand of symbols meets the predetermined criteria if at least four of the playing cards in the first hand of cards share a common suit.

18. The gaming system of claim 12, wherein the instance results in said qualified event if:

(a) the result of the instance played with the five playing cards is a non-winning result according to a traditional draw poker paytable; or (b) the result of the instance played with the five playing cards is a non-designated winning result.

19. The gaming system of claim 18, wherein the non-designated winning result is any winning result according to a traditional draw poker paytable except for a flush.

20. The gaming system of claim 12, wherein the instance does not result in the qualified event if:

the result of the instance played with the five playing cards is a flush.

21. A gaming system comprising:

at least one input device;

at least one display device;

at least one processor; and at least one memory device which stores a plurality of instructions, which when executed by the at least one processor, cause the at least one processor to operate with the at least one input device and the at least one display device to:

(a) receive a wager from a player to start a gaming session;

(b) begin a play of a game in the gaming session;

(c) randomly draw and display a plurality of a first set of symbols in the play of the game;

(d) enable the player to play an instance with the first set of symbols;

(e) if a plurality of the first set of symbols in the instance of the play of the game meets a triggering condition, start a bonus gaming session;

(f) in the bonus gaming session:

(i) if the instance results in a non-winning qualified event:

(A) increase a first qualified event counter by one; and (B) enable the player to play another instance with the first set of symbols;

(ii) if the instance results in a winning qualified event:

(A) increase a second qualified event counter by one;

(B) determine an associated award; and (C) end the bonus gaming session;

(iii) if the instance results in a non-qualified event:

(A) determine whether the result of the instance is a first designated winning result or a second designated winning result;

(B) if said result is said first designated winning result:

(I) determine a number of first qualified events stored on the first qualified event counter;

(II) determine a first paytable based upon the number of first qualified events stored on the first qualified event counter; and (III) determine an award according to the first paytable;

(C) if said result is said second designated winning result:

(I) determine a number of the second qualified events stored on the second qualified event counter;

(II) determine a second paytable based upon the number of second qualified events stored on the second qualified event counter; and (III) determine an award according to the second paytable; and (D) end the bonus gaming session; and (f) provide any awards to the player.

22. The gaming system of claim 21, wherein the first set of symbols includes five playing cards.

23. The gaming system of claim 22, wherein the first set of symbols meets the triggering condition if at least four of the playing cards share a common suit.

24. The gaming system of claim 23, wherein the instance of the bonus gaming session results in said non-winning qualified event if the result of the instance played with the five playing cards is a non-winning result according to a traditional draw poker paytable.

25. The gaming system of claim 23, wherein the instance of the bonus gaming session results in said winning qualified event if the result of the instance played with the five playing cards is a non-flush winning result according to a traditional draw poker table.

26. The gaming system of claim 23, wherein the instance of the bonus gaming session results in said non-qualified event if the result of the instance played with the five playing cards is a winning result with a flush ranking according to a traditional draw poker paytable.

27. The gaming system of claim 26, wherein a rank of the first designated winning result is one of: a royal flush and a straight flush.

28. The gaming system of claim 26, wherein a rank of the second designated winning result is any flush.

29. The gaming system of claim 26, wherein the second qualified event counter is reset at the end of said gaming session.

* * * * *

UNITED STATES PATENT AND TRADEMARK OFFICE

CERTIFICATE OF CORRECTION

PATENT NO. : 8,226,469 B2
APPLICATION NO. : 12/893738
DATED : July 24, 2012
INVENTOR(S) : Jason P. Pawloski et al.

It is certified that error appears in the above-identified patent and that said Letters Patent is hereby corrected as shown below:

IN THE CLAIMS

Column 28, in Claim 1, Line 31, after “ranking” insert --;--.
Column 28, in Claim 1, Line 32, replace “a” with --the first--.
Column 29, in Claim 10, Line 21, delete the second instance of “modified”.
Column 29, in Claim 10, Line 22, delete “said”.
Column 29, in Claim 10, Line 25, between “said” and “winning” insert --first--.
Column 29, in Claim 11, Line 59, replace “the” with --a--.
Column 30, in Claim 13, Line 8, between “discarded” and “card” insert --playing--.
Column 30, in Claim 13, Line 9, between “replacement” and “card” insert --playing--.
Column 30, in Claim 13, Line 10, between “of” and “cards” insert --playing--.
Column 30, in Claim 13, Line 12, before “cards” insert --playing--.
Column 30, in Claim 15, Line 21, between “of” and “cards” insert --playing--.
Column 30, in Claim 17, Line 27, replace “symbols” with --playing cards--.
Column 30, in Claim 17, Line 28, between “of” and “cards” insert --playing--.
Column 30, in Claim 18, Line 32, replace the first instance of “the” with --a--.
Column 30, in Claim 20, Line 42, replace the first instance of “the” with --a--.
Column 30, in Claim 21, Line 57, between “instance” and “with” insert --of the play of the game--.
Column 31, in Claim 21, Line 4, after “session;” insert --and--.
Column 31, in Claim 21, Line 6, replace the first instance of “the” with --a--.
Column 31, in Claim 21, Line 21, delete “the”.
Column 32, in Claim 24, Lines 6 to 7, delete “of the bonus gaming session”.
Column 32, in Claim 25, Lines 11 to 12, delete “of the bonus gaming session”.
Column 32, in Claim 26, Lines 16 to 17, delete “of the bonus gaming session”.

Signed and Sealed this
Fifth Day of March, 2013

Teresa Stanek Rea
*Acting Director of the United States Patent and Trademark Office*